(12) United States Patent
Hayashi et al.

(10) Patent No.: US 6,432,377 B1
(45) Date of Patent: Aug. 13, 2002

(54) PARTICLES FOR NON-MAGNETIC UNDERCOAT LAYER OF MAGNETIC RECORDING MEDIUM, METHOD THEREOF AND MAGNETIC RECORDING MEDIUM

(75) Inventors: Kazuyuki Hayashi; Keisuke Iwasaki; Hiroko Morii, all of Hiroshima-ken (JP)

(73) Assignee: Toda Kogyo Corp., Hiroshima (JP)

( * ) Notice: Subject to any disclaimer, the term of this patent is extended or adjusted under 35 U.S.C. 154(b) by 0 days.

(21) Appl. No.: 09/933,074

(22) Filed: Aug. 21, 2001

Related U.S. Application Data

(63) Continuation of application No. 09/420,008, filed on Oct. 18, 1999, now Pat. No. 6,299,973.

(30) Foreign Application Priority Data

Oct. 20, 1998 (JP) .......................................... 10-297876

(51) Int. Cl.$^7$ ............................................... C01G 49/02
(52) U.S. Cl. ....................... 423/632; 423/633; 423/634; 252/62.56
(58) Field of Search ................................ 423/632, 633, 423/634; 252/62.56

(56) References Cited

U.S. PATENT DOCUMENTS 5,750,250 A 5/1998 Hayashi et al. ............. 428/328
5,911,905 A * 6/1999 Tokunaga ................ 252/62.56
6,117,540 A * 9/2000 Tanaka et al. ............. 428/323

FOREIGN PATENT DOCUMENTS

| EP | 0769775 A1 | 4/1997 |
| EP | 0853066 A1 | 7/1998 |
| EP | 0867407 A2 | 9/1998 |
| EP | 0898269 A2 | 2/1999 |
| EP | 0928775 A2 | 7/1999 |
| EP | 0941966 A2 | 9/1999 |

OTHER PUBLICATIONS

European Search Report dated Feb. 3, 2000.

* cited by examiner

Primary Examiner—Stevan A. Resan
(74) Attorney, Agent, or Firm—Armstrong, Westerman, & Hattori, LLP

(57) ABSTRACT

The present invention provides particles for a non-magnetic undercoat layer of a magnetic recording medium, which comprises acicular hematite particles having an average major axial diameter of not more than 0.3 $\mu$m, a geometrical standard deviation in the major axial diameter of not more than 1.50 and a BET specific surface area of not less than 40 $m^2/g$, and containing a total amount of sodium of not more than 50 ppm calculated as Na. The acicular hematite particles have an excellent dispersibility in a vehicle so that a non-magnetic undercoat layer containing the particles is excellent in surface smoothness and strength. A magnetic recording medium using the non-magnetic undercoat layer is excellent not only in electromagnetic performance, but in storage stability.

4 Claims, No Drawings

PARTICLES FOR NON-MAGNETIC UNDERCOAT LAYER OF MAGNETIC RECORDING MEDIUM, METHOD THEREOF AND MAGNETIC RECORDING MEDIUM

This application is a division of prior application Ser. No. 09/420,008 filed Oct. 18, 1999, now U.S. Pat. No 6,299,973.

BACKGROUND OF THE INVENTION

1. Field of the Invention

The present invention relates to acicular hematite particles suitable for a non-magnetic undercoat layer of a magnetic recording medium, more particularly, to acicular hematite particles containing the total sodium amount of not more than 50 ppm, method thereof and a magnetic recording medium using said acicular hematite particles.

2. Description of the Prior Art

With a recent development of miniaturized and light-weight video or audio magnetic recording and reproducing apparatuses for long-time recording, magnetic recording media such as a magnetic tape and a magnetic disk have been increasingly and strongly required to have a higher performance, namely, a higher recording density, a higher output characteristic and a lower noise level.

Especially, much higher recording density of audio or video rapes is always desired and carrier signals tend to move to a shorter wavelength range.

Meanwhile, since an influence of self-demagnetization becomes prominent as the recording wavelength becomes shorter, it is necessary to reduce an influence of self-demagnetization by thinning of a magnetic recording layer with a view to higher recording density. That is supported, for example, on page 312 of "Development of Magnetic Materials and Technology for High Dispersion of magnetic Powder" published by Sogo Gi jutsu Center (1982), " . . . the conditions for high-density recording in a coated layer type are that high output characteristic and low level of noise with respect to short wavelength signals are maintained. To meet such conditions, it is required to have large coercive force Hc and residual magnetization Br . . . and to have a thinner thickness of the coated film . . . ".

In light of the foregoing situation, it is proposed and practiced to reduce self-demagnetization by decreasing the thickness of an upper magnetic recording layer and to solve the problems such as a deterioration in surface smoothness and a deterioration in electromagnetic performance by forming on a, non-magnetic base film at least one non-magnetic undercoat layer which comprises dispersing non-magnetic particles such as hematite particles in a binder (Japanese Patent Examined Publication (Kokoku) No. 6-93297, Japanese Patent Non-examined Publication (Kokai) Nos. 62-159338, 63-187413, 4-167225, 4-325915, 5-73882, 5-182177, 3-347017, 6-60362, etc.)

Moreover, with a development of miniaturized and light-weight video or audio magnetic recording and reproducing apparatuses for longtime recording, surroundings in which a magnetic recording medium is used and stored become diversified and it is reacted to have storage stability not only in ordinary conditions, but in high temperature and high humidity conditions.

As a cause of lowering the electromagnetic performance, the storage stability of a magnetic recording medium and the dispersion stability of a coating composition, a water-soluble alkali metal, in particular, a water-soluble sodium contained in the magnetic recording medium is pointed out.

The Japanese Patent Non-examined Publication (Kokai) No. 9-22524, for example, on page 3, column 3, lines 14–20 discloses; " . . . When a free fatty acid increases and water-soluble Na and Ca contained in non-magnetic particles abound, Na and Ca salts of the fatty acid tend to deposit to thus afford an adverse effect to the electromagnetic performance such as output performance and C/N, but by reducing those salts to the specific amount or less, an excellent storage stability and a low friction coefficient are obtained without a deterioration in electromagnetic performance. The Japanese Patent Non-examined Publication (Kokai) No. 62-209806 discloses on page 2, left upper column, lines 3–19;" . . . the residual $Na^+$ has been known to have a great influence on the quality of a magnetic coated film. As a typical example, a so-called "salt-depositing phenomenon" is pointed out. That is, when a polyvinyl chloride-based resin is used as part of a binder, crystals of NaCl deposit on the surface of a magnetic recording layer which invites D.O. (dropout) to thus damage the quality of magnetic tapes. Moreover, there are data showing that the above-mentioned mentioned phenomenon becomes a cause of "blocking" which is a characteristic of video tapes (Blocking is a phenomenon that when running of a video tape was stopped by power failure or the like with the video tape being loaded on a video deck under high temperature and high humidity conditions, the magnetic recording layer is held to be attached to an upper cylinder of the video deck, in consequence, part of the magnetic recording layer peels off.). Thus, the reduction of the residual $Na^+$ contained in the magnetic powders has been long-waited. "Furthermore, Japanese Patent No. 2641662 discloses on page 2, column 3, line 38 to column 4, line 14; " . . . fatty acids react with alkali metals such as sodium and potassium which are impurities of carbonblack to thereby form alkali metal salts of the fatty acids. These alkali metal salts of the fatty acids are insoluble in an organic solvent powder of these alkali metal salts of the fatty acids deposit on the surface of the magnetic recording layer to thus become a cause of dropout. " . . . The decomposition amount of the organic solvent is proportional to the amount of the alkali metals such as Na and K . . . The decomposition products of the organic solvent lower adsorptivity of a binder resin to the surface of an inorganic fine particle filter to result in a decrease in mechanical strength of a coated film. In addition, storage stability as a coating composition deteriorates."

It has been reported that an improvement in storage stability of a magnetic recording medium is tried by reducing a water-soluble sodium salt contained in a magnetic recording medium or in non-magnetic of magnetic particles added to the magnetic recording medium (Japanese Patent Non-examined Publication (Kokai) Nos. 62-209726, 62-209806, 9-22524, 9-147350, 9-231546, 9-170003, 10-177714, 10-198943, Japanese Patent Examined Publication (Kakoku) No. 7-82638, Japanese Patent No. 2641662, etc.).

As is discussed above, non-magnetic particles for a non-magnetic undercoat layer have been strongly demanded which are capable of providing a thin magnetic recording layer having a smooth surface and uniform thickness when the magnetic recording layer is formed on the non-magnetic undercoat layer obtained by dispersing the non-magnetic particles in a vehicle, and further, capable of providing a magnetic recording medium excellent in electromagnetic performance and storage stability, but such non-magnetic particles have not been hitherto obtained.

That is, in the above-mentioned Japanese Patent Non-examined Publication (Kokai) No. 9-147350, it is described that the amount of alkali metals contained in non-magnetic particles of a non-magnetic layer is less than 1500 ppm. However, as will be described later as comparative examples, when the non-magnetic particles contain approximately 1500 ppm of alkali metals, dispersibility in a vehicle is poor because of high desorption ratio of resin, and hence, a magnetic recording medium obtained by employing the non-magnetic particles as ones for a non-magnetic undercoat layer of a magnetic recording medium is weak in strength of a coated film and storage stability is not said to be satisfactory. Moreover, as methods for production of non-magnetic particles having alkali metals of less than 1500 ppm, a method for employing as an alkali aqueous solution, for example, an ammonium aqueous solution not containing alkali metals, and a method for carrying out sufficient washing after the completion of production or before the final heat-treatment are described. However, according to these methods, the total amount of sodium can only be reduced to approximately 100 ppm as described in the publication and can not be reduced to 50 ppm or less. Thus, when such non-magnetic particles are used as ones for a non-magnetic undercoat layer of a magnetic recording medium, it cannot be said that the storage stability of the obtained magnetic recording medium is satisfactory.

In the above-mentioned Japanese Patent Non-examined Publication Nos. 9-22524 and 9-170003, it is described that a soluble sodium contained in non-magnetic particles of a non-magnetic layer is 0–150 ppm or 300 ppm or less. However, as will be described later as comparative examples, according to these methods, a soluble sodium can be reduced to approximately 45 ppm but a difficulty-soluble sodium is contained in an amount of approximately 300 ppm. Since the difficultly-soluble sodium converts into soluble sodium through moisture contained in air or a coated film and to come cut to deposit, when the non-magnetic particles are used as ones for non-magnetic undercoat layer of a magnetic recording medium, the storage stability of the magnetic recording medium car not be said to be satisfactory.

SUMMARY OF THE INVENTION

An object of the present invention is to provide non-magnetic particles for a non-magnetic undercoat layer of a magnetic recording medium which can provide a thin magnetic recording layer having a smooth surface and a uniform thickness when a magnetic recording layer is formed on the non-magnetic undercoat layer obtained by dispersing the non-magnetic particles in a vehicle, and which can provide a magnetic recording medium excellent in electromagnetic performance and storage stability.

Another object of the present invention is to provide a method for producing the non-magnetic particles for a non-magnetic undercoat layer of a magnetic recording medium.

Still another object of the present invention is to provide a magnetic recording medium which is excellent in electromagnetic performance and storage stability.

Further objects and advantages of the present invention will be apparent from the detailed description below.

DETAILED DESCRIPTION OF THE INVENTION

The present invention is, in a first aspect, to provide particles for a non-magnetic undercoat layer of a magnetic recording medium, which comprises acicular hematite particles having an average major axial diameter of not more than 0.3 $\mu$m, a geometrical standard deviation of the major axial diameter of not more than 1.50 and a BET specific surface area of no: less than 40 m$^2$/g, and containing a total amount of sodium of not more than 50 ppm calculated as Na.

As a preferable embodiment, the acicular hematite particles are coated with at least one selected from the group consisting of an aluminium hydroxide, an aluminium oxide, a silicon hydroxide and a silicon oxide.

As a further preferable embodiment, an $S_{BET}/S_{TEM}$ defined by a ratio of a specific surface area ($S_{BET}$) measured by a BET method and a surface area ($S_{TEM}$) calculated from the major axial diameter and the minor axial diameter, measured from the particles in an electron microscopic photograph is 0.5 to 2.5.

The present invention is, in a second aspect, to provide a method for producing particles for a non-magnetic undercoat layer of a magnetic recording medium, which comprises the steps of:

dehydrating acicular goethite particles with the surfaces coated with a sintering-preventing agent to form acicular hematite particles, reducing the acicular hematite particles at a temperature of 250 to 600° C. under a reducing atmosphere to form acicular magnetite particles, washing with pure water and drying the acicular magnetite particles, oxidizing the acicular magnetite particles at a temperature of 650 to 850° C. under an oxidizing atmosphere and washing with pure water and drying the resulting high-density acicular hematite particles.

The present invention is, in a third aspect, to provide a method for producing particles for a non-magnetic undercoat layer of a magnetic recording medium, which comprises the steps of:

dehydrating acicular goethite particles to form acicular hematite particles, coating the surfaces of the acicular hematite particles with a sintering-preventing agent, reducing the acicular hematite particles at a temperature of 250 to 600° C. under a reducing atmosphere to form acicular magnetite particles, washing with pure water and drying the acicular magnetite particles, oxidizing the acicular magnetite particles at a temperature of 650 to 850° C. under an oxidizing atmosphere, and washing with pure water and drying the resulting high-density acicular hematite particles.

As a preferable embodiment in the above-mentioned two methods, the acicular magnetite particles and high-density acicular hematite particles are wet-pulverized prior to washing with pure water.

As a further preferable embodiment, the high-density acicular hematite particles are coated with at least one selected from the group consisting at an aluminium hydroxide, an aluminium oxide, a silicon hydroxide and a silicon oxide by treating the particles with an aqueous solution containing an aluminium compound, a silicone compound or the both compounds.

The present invention is, in a fourth aspect, to provide a magnetic recording medium comprising a non-magnetic base film, a non-magnetic undercoat layer formed or: the non-magnetic base film, comprising non-magnetic particles and a binder resin, and a magnetic recording layer formed on the non-magnetic undercoat layer, comprising magnetic particles and a binder resin, the improvement wherein the non-magnetic particles comprises particles for a non-magnetic undercoat layer as mentioned above.

Hereinafter, the present invention will be explained in detail.

First, particles for a non-magnetic undercoat layer according to the present invention will be explained.

The particles for a nor-magnetic undercoat layer according to the present invention comprises acicular hematite particles having an average major axial diameter of not more than 0.3 μm, a geometrical standard deviation of the major axial diameter of not more than 1.50 and a BET specific surface area of not less than 40 m²/g, and containing the total amount of sodium of not more than 50 ppm calculated as Na.

The word "acicular" of the acicular hematite particles herein includes not only an acicular shape, literally, but, for example, a spindle share and a rice shape.

The average major axial diameter of the acicular hematite particles for a non-magnetic undercoat layer is not more than 0.3 μm, preferably 0.005 to 0.3 μm. If it is less than 0.005 μm, the dispersion in a vehicle tends to be difficult upon the production of a non-magnetic coating composition because of increased intermolecular force caused by fine particles. If it is more than 0.3 μm, the surface smoothness of a coated film tends to be deteriorated because of the increased particle size. The average major axial diameter is more preferably 0.02 to 0.2 μm when considering the dispersibility in the vehicle and surface smoothness of a coated film.

The geometrical standard deviation of the major axial diameter of the acicular hematite particles is not more than 1.50. If it is more than 1.50, the coarse particles give an adverse effect to the surface smoothness. It is more preferably not more than 1.40, still more preferably not more than 1.35, when considering the surface smoothness of a coated film. Further, if the industrial productivity is taken into consideration, the lower limit thereof is approximately 1.01.

The BET specific surface area of the acicular hematite particles is not less than 40 m²/g, preferably to 150 m²/g. More preferably, it is 45 to 100 m²/g, still more preferably 50 to 80 m²/g for the same reasons as in the upper and lower limits of the above-mentioned average major axial diameter.

The total amount of sodium as calculated as Na contained in the acicular hematite particles is not more than 50 ppm. If it is more than 50 ppm, difficulty-soluble sodium salts contained in the particles are converted into soluble sodium salts through moisture contained in air and a coated film to thus deposit on the surfaces of the particles, then the soluble sodium salts react with fatty acids added to the coated film to thus generate metal salts of the fatty acids, which gradually lowers electromagnetic performance of the obtained magnetic recording medium and as a result, the storage stability becomes worse. In some cases, the dispersibility of the acicular hematite particles in a vehicle is liable to be deteriorated and under high humidity surroundings, in particular, an efflorescence phenomenon sometimes occurs on the surface of the magnetic recording medium. If the storage stability of the magnetic recording medium is taken into consideration, the total amount of sodium as calculated as Na contained in the acicular hematite particles is preferably not more than 45 ppm, more preferably not more than 40 ppm, still more preferably not more than 35 ppm. The lower limit is approximately 0.01 ppm, if the industrial productivity is taken into consideration.

The storage stability of the acicular hematite particles (the content of the soluble sodium salts calculated as Na contained in the acicular hematite particles after left to stand for 14 days under surroundings at a temperature of 60° C. and a relative humidity of 90%) is preferably not more than 40 ppm. If it exceeds 40 ppm, the fatty acids added to a coated film and the soluble sodium salts react to generate metal salts of the fatty acids and they gradually lower the electromagnetic performance of a magnetic recording medium so that the storage stability is deteriorated. Under high humidity surroundings, in particular, an efflorescence phenomenon sometimes occurs on the surface of the magnetic recording medium. If the storage stability of the magnetic recording medium obtained is taken into consideration, it is preferably not more than 35 ppm, more preferably not more than 30 ppm, still more preferably not more than 25 ppm. The lower limit is, if the industrial productivity is taken into consideration, approximately 0.01 ppm.

The average minor axial diameter of the acicular hematite particles is preferably 0.0025 to 0.15 μm and the aspect ratio (ratio of average major axial diameter/average minor axial diameter) is preferably not less than 2.

The average minor axial diameter is more preferably 0.01 to 0.10 μm for the same reasons as in the lower and upper limits of the above-mentioned average major axial diameter.

The upper limit of the aspect ratio is preferably 20. If it is more than 20, the particles twine in a vehicle upon the preparation of a non-magnetic coating composition, which often lowers dispersibility or increases viscosity. If it is less than 2. the stiffness of a coated film obtained becomes insufficient. If the dispersibility in the vehicle and the stiffness of the coated film are taken into consideration, the aspect ratio is more preferably 3 to 10.

The acicular hematite particles have preferably a higher densification. The degree of densification is defined by the ratio of $S_{BET}/S_{TEM}$ in which the specific surface area $S_{BET}$ is measured by a BET method and the surface area $S_{TEM}$ is calculated from the major axial diameter and the minor axial diameter, which were measured from the particles in an electron microscopic photograph, and have preferably a value of 0.5 to 2.5.

If the $S_{BET}/S_{TEM}$ value is less than 0.5, the acicular hematite particles are densified, but the particle size increases because of sintering of the particles and thus a coated film excellent in the surface smoothness can not be obtained. If it is more than 2.5, the densification is rot sufficient to allow many pores to exist in the interiors or on the surfaces of the particles so that the dispersibility in a vehicle may be insufficient. If the dispersibility in the vehicle and the surface smoothness of the coated film are taken into consideration, its value is preferably 0.7 to 2.0, more preferably 0.8 to 1.6.

The hematite particles are low in resin desorption ratio and if it is represented by a value obtained by the method as will be described later, its value is preferably not more than 30%. If it is more than 30%, the dispersibility in a vehicle and the dispersion stability not only lower, but the stiffness of the coated film lowers. If the dispersibility, dispersion stability in the vehicle and the stiffness of the coated film are taken into consideration it is more preferably not more than 25%, still more preferably not more than 20%.

The surfaces of the acicular hematite particles may, if necessary, be coated with at least one selected from the group consisting of an aluminium hydroxide, an aluminium oxide, a silicon hydroxide and a silicon oxide (hereinafter referred to coating substance). The acicular hematite particles coated are improved in the dispersibility in the vehicle as compared with non-coated ones.

The amount of the coating substance is preferably 0.01 to 50% by weight calculated as Al and/or $SiO_2$ on the basis of the acicular hematite particles. If it is less than 0.01 by weight, the dispersibility-improving effect resulting from the coating is difficult to be obtained, and if it is more than 50% by weight, the coating effect arrives at the saturated level and thus the coating more than necessary is meaningless. If the dispersibility in the vehicle and the industrial productivity are taker into consideration, it is more preferable 0.05 to 20% by weight.

The acicular hematite particles coated with the coating substance have almost the same particle size, aspect ratio, BET specific surface area, geometrical standard deviation, $S_{BET}/S_{TEM}$ and the total amount of sodium as the non-coated acicular hematite particles.

Next, a magnetic recording medium according to the present invention will be explained.

The magnetic recording medium according to the present invention comprises a non-magnetic base film, a non-magnetic undercoat layer formed on the ran-magnetic base film and a magnetic recording layer formed on the non-magnetic undercoat layer.

As the non-magnetic base film, synthetic resins such as polyethylene terephthalate, polyethylene, polypropylene, polycarbonate, polyethylene naphthalate, polyamide, polyamideimide and polyimide, foil and plate of a metal such as aluminium and stainless steel, and various kinds of paper, which are widely used for the production of a magnetic recording medium can be used. The thickness of the non-magnetic base film is preferably 1.0 to 300 $\mu$m, more preferably 2.0 to 200 $\mu$m though variable depending on the material employed. In the case of a magnetic disc, polyethylene terephthalate is ordinarily used as the non-magnetic base film, and its thickness is ordinarily 50 to 300 $\mu$m, preferably 60 to 200 $\mu$m. In the case of a magnetic tape, when polyethylene terephthalate is used, its thickness is ordinarily 3 to 100 $\mu$m, preferably 4 to 20 $\mu$m, and when polyethylene naphthalate is used, its thickness is ordinarily 3 to 50 $\mu$m, preferably 4 to 200 $\mu$m, and when the polyamide is used, its thickness is ordinarily 1 to 100 $\mu$m preferably 3 to 7 $\mu$m.

The non-magnetic undercoat layer of a magnetic recording medium in the present invention comprises acicular hematite particles which are particles for a non-magnetic undercoat layer and a binder resin.

As the binder resin, various hinder resins which are widely used for the production of a magnetic recording medium can be used.

Examples of the binder resin are vinyl chloride-vinyl acetate copolymer, urethane resin, vinyl chloride-vinyl acetate-maleic acid terpolymer, urethane elastomer, butadiene-acrylonitrile copolymer, polyvinyl butyral, cellurose derivatives such as nitrocellulose, polyester resin, synthetic rubber resins such as polybutadiene, epoxy resin, polyamide resin, polyisocyanates, electron beam-curing acryl urethane resin and mixtures thereof. Each of these binder resins may contain a functional group such as —OH, —COOH, —SO$_3$M, —OPO$_2$M$_2$ and —NH$_2$, wherein M represents H, Na or K. If the dispersibility of the acicular hematite particles is taken into consideration, the binder resin containing —COOH or —SO$_3$M as the functional group is preferable.

The blending ratio of the acicular hematite particles and the binder resin is 5 to 2000 parts by weight, preferably 100 to 1000 parts by weight based on 100 parts by weight of the binder resin. If the acicular hematite particles are less than 5 parts by weight, the acicular hematite particles contained in a non-magnetic coating composition is too short to obtain a continuously dispersed layer of the acicular hematite particles, and thus the surface smoothness and the stiffness of the non-magnetic undercoat layer can not be said to be sufficient. If it is more than 2000 parts by weight, the acicular hematite particles are too plentiful with respect to the binder resin to sufficiently disperse in a non-magnetic coating composition and as a result, the coated film with the sufficient surface smoothness is difficult to be obtained. Moreover since the acicular hematite particles are not bound adequately by the binder resin, the obtained coated film is apt to be brittle.

The coated thickness of the non-magnetic undercoat layer is preferably 0.2 to 10.0 $\mu$m. If it is less than 0.2 $\mu$m the surface roughness of the non-magnetic base film is not improved sufficiently and the stiffness is also apt to be insufficient. If the thinning of a magnetic recording medium and the stiffness of the coated film are taken into consideration, the coated thickness is more preferably 0.5 to 5.0 $\mu$m.

Meanwhile, it is possible to add to the non-magnetic undercoat layer, additives such as a lubricant, a polishing agent and an antistatic agent which are ordinarily used for the production of a magnetic recording medium.

The gloss of the non-magnetic undercoat layer using acicular hematite particles, the surfaces of which are not coated with the above-mentioned coating substance such as aluminium hydroxide is 190 to 300%, preferably 193 to 300%, more preferably 195 to 300%, the surface roughness Ra thereof is 0.5 to 8.0 nm, preferably 0.5 to 7.5 nm, more preferably 0.5 to 7.0 nm, and the stiffness (Young's modulus; relative value) thereof is 125 to 160 preferably 128 to 160.

The gloss of the non-magnetic undercoat layer using the acicular hematite particles, which are coated with the above-mentioned coating substance such as aluminium hydroxide is 192 to 300%, preferably 195 to 300%, more preferably 200 to 300%, the surface roughness Ra thereof is 0.5 to 7.8 nm, preferably 0.5 to 7.0 nm, more preferably 0.5 to 6.8 nm, and the stiffness of the coated film (Young's modulus; relative value) is 128 to 160, preferably 130 to 160.

The magnetic recording layer in the present invention comprises magnetic particles and a binder resin.

As the magnetic particles, Co-coated magnetic iron oxide particles obtained by coating magnetic iron oxide particles such as maghemite particles ($\gamma$–Fe$_2$O$_3$) and magnetite particles (FeOx·Fe$_2$O$_3$, $0<x\leq1$) with Co or Co and Fe, Co-coated magnetic iron oxide particles obtained by adding the different kinds of elements other than iron, such as Co, Al, Ni, P, Zn, Si, B and a rare earth element to the above-mentioned Co-coated magnetic iron oxide particles, acicular metal magnetic particles mainly containing iron, acicular iron-based alloy magnetic particles containing elements other than iron, such as Co, Al, Ni, P, Zn, Si and B, plate-like magnetoplumbite ferrite particles containing Ba, Sr, Ba—Sr, and plate-like magnetoplumbite ferrite particles containing one or more of a coercive force-reducing agent selected from divalent and tetravalent metals such as Co, Ni, Zn, Mn, Mg, Ti, Sn and Zr are exemplified, and these may be used singly or in combination of two or more.

Meanwhile, under the consideration of high-density recording of recent magnetic recording medium, among the above magnetic particles, the acicular metal magnetic particles mainly containing iron and the acicular iron-based alloy magnetic particles containing elements other than iron, such as Co, Al, Ni, P, Zn, Si, B and a rare earth metal element are preferable.

The average major axial diameter of the magnetic particles (average particle size in the case of a plate-dike particle) is 0.01 to 0.50 $\mu$m, preferably 0.03 to 0.30 $\mu$m, The shape of the magnetic particles is acicular or plate-like. The word "acicular" herein means not only an acicular shape literally, but a spindle shape and a rice shape.

When the shape of the magnetic particles is acicular, the aspect ratio is not less than 3, preferably not less than 5. If the dispersibility in a vehicle upon the preparation of a magnetic coating composition is taken into consideration, the upper limit is approximately 15, preferably approximately 10.

When the shape of the magnetic particles is plate-like, the plate ratio (ratio of an average particle size/an average thickness) is not less than 2, preferably not less than 3. If the dispersibility in a vehicle upon the preparation of a magnetic coating composition, the upper limit is approximately 20, preferably approximately 15.

As the magnetic properties, the coercive force is 500 to 3200 Oe, preferably 550 to 3200 Oe, the saturation magnetization is 50 to 170 emu/g, preferably 60 to 170 emu/g. If the properties such as high-density recording of the magnetic recording medium are taken into consideration, the coercive force is more preferably 900 to 3200 Oe and the saturation magnetization is more preferably 70 to 170 emu/g.

As the binder resin, the binder resin used for forming the above-mentioned non-magnetic undercoat layer can be used.

The blending ratio of the magnetic particles and the binder resin is 200 to 2000 parts by weight, preferably 300 to 1500 parts by weight of the magnetic particles based on 100 parts by weight of the binder resin.

The coated thickness of the magnetic recording layer formed on the non-magnetic undercoat layer is 0.01 to 5.0 $\mu$m. If it is less than 0.01 $\mu$m, the uniform coating is difficult and the uneven coating tends to occur. If it is more than 5.0 $\mu$m, an influence of the self-demagnetization becomes large and the desired electromagnetic performance is difficult to be obtained. The coated thickness is preferably 0.05 to 1.0 $\mu$m.

It is possible to add to the magnetic recording layer, additives such as a lubricant, a polishing agent and an antistatic agent which are normally used.

The magnetic recording medium according to the present invention, when the Co-coated magnetic iron oxide particles are used as the magnetic particles, has a coercive force of 300 to 1500 Oe preferably 550 to 1330 Oe, a squareness (residual flux density Br/saturation flux density Bm) of 0.85 to 0.95, preferably 0.86 to 0.95, a gloss of a coated film of 130 to 200%, preferably 140 to 200%, a surface roughness Ra of a coated film of not more than 12.0 to 11.0 nm, more preferably 2.0 to 10.0 nm, a Young's modulus (relative value to a commercially available video tape: AV T-120 produced by Victor Company of Japan, Limited) of 125 to 160, preferably 130 to 160. As the electromagnetic performance, the output at 4 MHz is not less than +0.5 dB as compared with that of the standard tape obtained by using as the non-magnetic particles for a non-magnetic undercoat layer, non-magnetic particles other than those of the present invention and using the same magnetic particles for a magnetic recording layer as in the present invention, the output drop at 4 MHz after stored at a temperature of 60° C. and a relative humidity of 90% for 14 days is not more than 1.0 dB, and the stain on a head after 30-minute running of a magnetic tape is 2, preferably 1, according to the evaluation method as will be described later.

The magnetic recording medium according to the present invention, when the acicular metal magnetic particles mainly containing iron or acicular iron-based alloy magnetic particles are used as the magnetic particles, has a coercive force of 800 to 3200 Oe, preferably 900 to 3200 Oe, a squareness (residual flux density Br/saturation flux density Bm) of 0.85 to 0.95, preferably 0.86 to 0.95, a gloss of a coated film of 180 to 300%, preferably 190 to 300%, a surface roughness Ra of a coated film of not more than 12.0 nm, preferably 2.0 to 11.0 nm, more preferably 2.0 to 10.0 nm, a Young's modulus (relative value to a commercially available video tape: AV T-120 produced by Victor Company of Japan, Limited) of 124 to 160, preferably 128 to 160. As the electromagnetic performance, the output at 7 MHz is not less than +0.5 dB as compared with that of the standard tape obtained by using as the non-magnetic particles for a non-magnetic undercoat layer, the non-magnetic particles other than those of the present invention and using the same magnetic particles for a magnetic recording layer as in the present invention, the output drop at 7 MHz after stored at a temperature of 60° C. and a relative humidity of 90% for 14 days is not more than 1.0 dB, and the stain on a head after 30-minute running of a magnetic tape is 2, preferably 1, according to the evaluation method as will be described later.

The magnetic recording medium according to the present invention, when the plate-like magnetoplumbite ferrite particles are used as the magnetic particles, has a coercive force of 800 to 3200 Oe, preferably 900 to 3200 Oe, a squareness (residual flux density Br/saturation flux density Bm) of 0.85 to 0.95, preferably 0.86 to 0.95, a gloss of the coated film of 160 to 300%, preferably 170 to 300%, a surface roughness Ra of a coated film of not more than 12.0 nm, preferably 2.0 to 11.0 nm, more preferably 2.0 to 10.0 nm, a Young's modulus (relative value to a commercially available video tape: AV T-120 produced by Victor Company of Japan, Limited) of 124 to 160, preferably 128 to 160. As the electromagnetic performance, the output at 7 MHz is not less than +0.5 dB as compared with that of the standard tape obtained by using as the non-magnetic particles for a non-magnetic undercoat layer, non-magnetic particles other than those of the present invention and using the same magnetic particles for a magnetic recording layer as in the present invention, the output drop at 7 MHz after stored at a temperature of 60° C. and a relative humidity of 90% for 14 days is not more than 1.0 dB, and the stain on a head after 30-minute running of a magnetic tape is 2, preferably 1, according to the evaluation method as will be described later.

Next, the method for producing the acicular hematite particles for a non-magnetic undercoat layer according to the present invention will be explained.

The acicular hematite particles are obtained by dehydrating by heating acicular goethite particles obtained by an ordinary method to thus obtain acicular hematite particles, reducing the obtained acicular hematite particles to thus obtain acicular magnetite particles, removing by washing sodium deposited on the surfaces, then oxidizing.

The goethite particles as the starting material in the present invention can be obtained by an ordinary method, i.e., conducting an oxidation reaction by passing an oxygen-containing gas such as air into a suspension containing iron-containing presipitates such as iron hydroxide and iron carbonate obtained by reacting an aqueous ferrous salt solution with an aqueous alkali hydroxide solution, an aqueous alkali carbonate solution or an aqueous alkali hydroxide and an alkali carbonate solution.

Meanwhile, it is possible to add, during the course of the synthetic reaction of the acicular goethite particles, the different elements such as Ni, Zn, P, Si and Al which are added to enhance the characteristics such as the major axial diameter, minor axial diameter and aspect ratio.

Prior to the reduction by heating, it is necessary to conduct the coating treatment with a sintering-preventing agent. The coating treatment is performed by adding the sintering-preventing agent into an aqueous suspension containing acicular goethite particles or low-density hematite particles obtained by dehydrating by heating the acicular goethite particles at a temperature of 250 to 500° C., mixing by stirring, followed by filtration, washing and drying.

As the sintering-preventing agent, it is possible to use sintering-preventing agents which are ordinarily used. Examples are phosphorus compounds such as sodium hexamethaphosphate, polyphosphoric acid and orthophosphoric acid, silicon compounds such as water glass #3, sodium orthosilicate, sodium metasilicate and colloidal silica, boron compounds such as boric acid, aluminium compounds such as aluminium acetate, aluminium sulfate, aluminium chloride, aluminium nitrate and sodium aluminate, and titanium compounds such as titanyl sulfate. Among these compounds, orthophosphoric acid, colloidal silica, boric acid and aluminium acetate are preferable. These are used singly or in combination of The coated amount of the sintering-preventing agent is preferably 0.05 to 10% by weight, more preferably 0.1 to 5% by weight in an amount calculated as P, $SiO_2$, B, Al or Ti based on the total weight of the particles.

The total sodium content calculated as Na of the acicular goethite particles obtained is 600 to 3000 ppm, the content of soluble sodium salts calculated as Na is 300 to 1500 ppm, the average major axial diameter is 0.01 to 0.3 μm, the average minor axial diameter is 0.001 to 0.15 μm, the aspect ratio is 3 to 25, the geometrical standard deviation of the major axial diameter is not more than 1.5 and the BET specific surface area is 50 to 250 $m^2$/g.

The acicular goethite particles coated with the sintering-preventing agent is dehydrated by heating at a temperature of 250 to 500° C. to obtain the low-density acicular hematite particles.

The low-density acicular hematite particles are 600 to 3000 ppm in total content of sodium salts calculated as Na, 500 to 2000 ppm in content of soluble sodium salts calculated as Na, 0.005 to 0.3 μm in average major axial diameter, 0.0025 to 0.15 μm in average minor axial diameter, 3 to 20 in aspect ratio, not more than 1.5 in geometrical standard deviation of the major axial diameter, 70 to 350 $m^2$/g in BET specific surface area, and 2.5 to 6.0 in degree of densification $S_{BET}/S_{TEM}$.

If the heating temperature is lower than 250° C., the dehydration reaction takes a long time and thus it is not preferable. If it is higher than 500° C., the dehydration reaction takes place rapidly to thus result in deformation in particle shape and sintering among the particles, and thus it is not preferable.

The acicular hematite particles obtained by the heat-treatment are low-density particles having a lot of dehydrated pores, which are dehydrated from the acicular goethite particles, and the BET specific surface area is approximately 1.2 to 2 times that of the acicular goethite particles as the starting particles.

The low-density hematite particles obtained are then subjected to the reduction treatment at a temperature of 250 to 600° C. under a reducing atmosphere to thus form low-density acicular magnetite particles so that sodium compounds contained in the interiors of particles may be deposited on the surfaces of the particles.

If the temperature is lower than 250° C., the reduction reaction takes a longer time and thus it is not preferable. If it is higher than 600° C., the reduction reaction takes place rapidly to thus invite the deformation in particle shape and sintering among the particles and thus it is not preferable.

The low-density magnetite particles obtained are 600 to 3000 ppm in total amount of sodium calculated as Na, 600 to 3000 ppm in soluble sodium salts calculated as Na, 0.01 to 0.3 μm in average major axial diameter, 0.005 to 0.15 μm in average minor axial diametel, 2 to 20 in aspect ratio, not more than 1.5 in geometrical standard deviation of the major axial diameter, 40 to 250 $m^2$/g in BET specific surface area, and 2.5 to 5.0 in degree of densification $S_{BET}/S_{TEM}$.

The low-density acicular magnetite particles obtained are roughly pulverized into coarse particles by a dry method and formed into a slurry. The slurry is then pulverized by a wet method to thus remove the coarse particles. The wet method pulverization is conducted by the use of ball mill, a sand grinder, a Daino mill, a colloid mill or the like to such an extent that coarse particles of not less than 44 μm are not more than 10%, preferably not more than 5%, more preferably 0%. If the coarse particles of not less than 44 μm remain in an amount of more than 10%, the sufficient removal effect of the deposited sodium component at the washing step is not obtained.

The low-density acicular magnetite particles obtained by pulverizing the coarse particles by the wet pulverization method are filtered and washed with pure water by an ordinary method and the sodium components are removed by washing, then dried.

As the method for washing with water, any known methods which are industrially used, such as a decantation method, a dilution method using a filter thickner and a method of passing water into a filter press are employed.

The low-density acicular magnetite particles after washing with pure water are 50 to 1500 ppm in total sodium content calculated as Na, 30 to 300 ppm in soluble sodium salts calculated as Na, 0.01 to 0.3 μm in average major axial diameter, 0.005 to 0.15 μm in average minor axial diameter, 2 to 20 in aspect ratio, not more than 1.5 in geometrical standard deviation of the major axial diameter, 40 to 250 $m^2$/g in BET specific surface area, and 2.5 to 5.0 in degree of densification $S_{SET}/S_{TEM}$.

Then, the low-density acicular magnetite particles are subjected to the oxidation reaction at a temperature of 650 to 850° C. under an oxidizing atmosphere to thus obtain high-density acicular hematite particles by way of acicular maghemite particles.

If the temperature is lower than 650° C., since the acicular maghemite particles are mixed in the acicular hematite particles, the obtained acicular particles have magnetism. Moreover, the acicular hematite particles have a large number of dehydrated pores inside the particles or on the surfaces of the particles due to the insufficient densification. As a result, the dispersibility in a vehicle is insufficient and a coated film with the surface smoothness is difficult to be obtained. If the temperature is higher than 850° C., though the acicular hematite particles are sufficiently densified, since sintering among the particles takes place, the particle size increases and thus a coated film with the surface smoothness is difficult to be obtained.

The high-density acicular hematite particles are 50 to 1500 ppm in total sodium content calculated as Na, 50 to 1500 ppm in soluble sodium salts calculated as Na, 0.005 to 0.3 μm in average major axial diameter, 0.0025 to 0.15 μm in average minor axial diameter, 2 to 20 in aspect ratio, not more than 1.5 in geometrical standard deviation of the major axial diameter, 40 to 250 $m^2$/g in BET specific surface area, and 2.5 to 5.0 in degree of densification $S_{SET}/S_{TEM}$.

The obtained high-density acicular hematite particles are, in the same manner as in the washing step of the low-density acicular magnetite particles, pulverized by a dry method and formed into a slurry, thereafter pulverized by a wet method, filtered and washed with pure water by an ordinary method, whereby the sodium component deposited on the surfaces of the particles are removed by washing and dried.

In order to improve the affinity with the binder resin to enhance the dispersibility, the so obtained acicular hematite particles may, if necessary, be coated with at least one selected from an aluminium hydroxide, an aluminium oxide, a silicon hydroxide and a silicon oxide.

The coating treatment is conducted by adding the aluminium compound or the silicon compound or the both compounds to a suspension containing the acicular hematite particles obtained by washing with water after the oxidation reaetion, followed by mixing and stirring, and further adjusting a pH value, if required, followed by filtration, washing with water, drying and pulverization. Deaeration and a compression treatment or the like may be further conducted, if necessary.

As the aluminium compound in the present invention, aluminium salts such as aluminium acetate, aluminium sulfate, aluminium chloride and aluminium nitrate, aluminium compounds such as aluminium hydroxide, aluminium oxide and alumina sol are usable.

The amount of the aluminium compound calculated as Al is 0.01 to 50% by weight, preferably 0.05 to 20% by weight based on the weight of the acicular hematite particles. If it is less than 0.01% by weight, the improving effect of dispersing in a vehicle is not obtained. If it is more than 50% by weight, the dispersibility-improving effect arrives at the saturation level and thus addition more than necessary is meaningless.

As the silicon compound in the present invention, silicates such as potassium silicate, silicon compounds such as silicon hydroxide and silicon oxide and collidal silica are usable.

The amount of the silicon compound added calculated as $SiO_2$ is 0.01 to 50% by weight, preferably 0.05 to 20% by weight based on the weight of the acicular hematite particles. If it is less than 0.01% by weight, the improving effect of dispersing in a vehicle is not obtained. If it is more than 50% by weight, the dispersibility-improving effect arrives at the saturation level and thus addition more than necessary is meaningless.

When the aluminium compound and the silicon compound are mixed, the total amount calculated as Al and $SiO_2$ is 0.01 to 50% by weight, more preferably 0.05 to 20% by weight.

Next, the method for producing a non-magnetic substrate for a magnetic recording medium having a non-magnetic undercoat layer in the present invention will be explained.

The non-magnetic substrate for a magnetic recording medium in the present invention is obtained by coating a non-magnetic coating composition containing acicular hematite particles, a binder resin and a solvent, on a non-magnetic base film to thus form a non-magnetic undercoat lyer thereon, and drying.

As the solvent, solvents which are ordinarily used for the production of a magnetic recording medium such as methyl ethyl ketone, toluene, cyclohexanone, methylisobutyl, ketone and tetrahydrofuran are exemplified and these are used singly or in combination of two or more.

The amount of the solvent in the non-magnetic coating composition is preferably 50 to 95 parts by weight based on 100 parts by weight of the non-magnetic coating composition. If it is less then 50 parts by weight, the viscosity of the non-magnetic coating composition obtained becomes too high to make the coating difficult. If it is more than 95 parts by weight, the volatile amount of the solvent becomes too large and thus it is disadvantageous industrially.

The non-magnetic coating composition in the present invention is excellent in dispersion stability and the change ratio in gloss showing the dispersion stability of the non-magnetic coating composition, which is obtained by a measurement method as will be mentioned later is not more than 5%.

Next, the method for producing a magnetic recording medium according to the present invention will be explained.

The magnetic recording medium of the present invention is obtained by coating a magnetic coating composition containing magnetic particles, a binder resin and a solvent on the non-magnetic substrate having the non-magnetic undercoat layer to thus form a magnetic recording layer thereon, and drying.

As the solvent, the above-mentioned solvents as used in the non-magnetic paint are usable.

The amount of the solvent is preferably 50 to 95 parts by weight based on 100 parts by weight of the magnetic coating composition. If it is less than 50 parts by weight, the viscosity of the obtained magnetic coating composition becomes too high to make the coating difficult. If it is more than 95 parts by weight, the volatile amount of the solvent becomes too large and thus it is disadvantageous industrially.

The most important point is that when the high-density hematite particles having an excellent dispersibility in the vehicle and containing not more than 50 ppm of the total content of sodium are used as the non-magnetic particles for a non-magnetic undercoat layer, it is possible to enhance the surface smoothness and the strength of the non-magnetic undercoat layer due to the excellent dispersibility in the binder resin, and that when a magnetic recording layer is formed on the non-magnetic undercoat layer, it is possible not only to form a thin layer having the smooth surface and the uniform thickness, but to obtain a magnetic recording medium having an excellent electromagnetic performance and storage stability.

The reason why the total content of sodium contained in the acicular hematite particles can be reduced to not more than 50 ppm is presumably considered that since difficulty-soluble sodium salts fixed to crystals inside the non-magnetic particles which can not be removed by an ordinary washing deposit on the surfaces of the particles with the modification of the crystal form and convert into soluble sodium salts, it became possible to remove the sodium by an ordinary washing with water.

The reason why the surface smoothness and the strength of the non-magnetic undercoat layer are enhanced is presumably considered that since it is possible to sufficiently remove by washing with water the sodium salts which cause the high-density hematite particles to aggregate by firmly crosslinking, the aggregates are separated into substantially discrete particles, and since in the vehicle, the adsorption of the binder resin onto the surfaces of the acicular hematite particles is made directly through elements other than the sodium element, the desorption of the binder resin from the surfaces of the acicular hematite particles decreases, so that the dispersibility of the acicular hematite particles is improved.

The reason why the storage stability as well as the electromagnetic performance of the magnetic recording medium is enhanced is presumably considered that since it is possible to reduce the total content of sodium in the acicular hematite particles contained in the non-magnetic undercoat layer to not more than 50 ppm, as a result, to reduce not only the suluble sodium salts on the surfaces of the particles, but the difficulty-soluble sodium salts contained in the interiors of the particles which deposit on the surfaces of the particles as converted to the soluble sodium salt for some causes such as moisture in air, the metal salts of fatty acids synthesized by the reaction with fatty acids added to a coated film can be reduced.

Next, the typical embodiment of the present invention will be described.

The remaining amount of coarse particles on a sieve was measured by passing through a 325 mesh-sieve (sieve opening: 44 $\mu$m) a slurry containing 100 g of the particles, the concentration of which was preliminarily measured after the wet-pulverization, and weighing the particles which do not pass through the sieve.

The average major axial diameter and the average minor axial diameter of the particles are represented by an average values of 350 particles in an electron microscopic photograph (×30,000) enlarged 4-fold in the longitudinal and transverse directions.

The aspect ratio of the particles was calculated from a ratio of the average major axial diameter to the average minor axial diameter.

The particle size distribution of the major axial diameter of the particles is represented by a geometrical standard deviation obtained by the following method. That is, the major axial diameters of 350 particles in the enlarged electron microscopic photograph were measured. The actual major axial diameters of the particles and the accumulative number of particles were obtained from the calculation on the basis of the measured values. In a logarithmic-normal probability paper, the major axial diameters were plotted at the same intervals on the abscissa and the accumulative number of particles passed through the sieve belonging to each interval of the major axial diameters was plotted by percentage on the ordinate by a statistical technique. The major axial diameters corresponding to the number of particles of 50% and 84.13%, respectively, were read from the graph, and the geometrical standard deviation was determined from the following equation:

Geometrical standard deviation=(major axial diameter corresponding to the accumulative number of particles of 84.13%)/(major axial diameter corresponding to the accumulative number of particles of 50%) (geometrical average diameters)

As the geometrical standard deviation becomes close to 1, the particle size distribution of the average axial diameter becomes excellent.

The specific surface area was represented by a value measured by a BET method (nitrogen adsorption method).

The total content of sodium contained in the particles was measured by the following method. That is, 1.000 g of the particles was charged into a 200 ml beaker. Then, 25 ml of a 12 mol/l hydrochloric acid were added and the particles were dissolved by heating with a lid of a watch glass put on a beaker. After cooling, the contents were transferred to a 500 ml measuring flask and pure water was added accurately to a 500 ml solution, and the total content of sodium in the solution was measured by the use of Industively Coupled Plasma Atomic Emission Spectrophotometer manufactured by Seiko Instruments Inc.

The content of the soluble salts was measured by the following method. That is, 5 g of the particles were charged into a 300 ml conical flask. 100 ml of pure water were added, heated and boiled for 5 minutes, after stoppering, cooled to room temperature. Then, pure water was added in an amount equivalent to the pure water lost by boiling, and after stoppering, the contents in the conical flask were shaked for 1 minute and left to stand for 5 minutes. The supernatant liquid was filtered by the use of a No. 5 C filter paper and the content of $Na^+$ in the filtrate was measured by the use of Inductively Coupled Plasma Atomic Emission Spectrophotometer manufactured by Seiko Instruments Inc.

The storage stability of the acicular hematite particles was represented by a content of the soluble salts (calculated as Na) measured by the same method as mentioned above, after left to stand at a temperature of 60° C. and a relative humidity of 90% for 14 days.

The degree of densification of the particles is represented by a value of $S_{BET}/S_{TEM}$. The $S_{BET}$ is a specific surface area measured by the above-mentioned BET method. The $S_{TEM}$ is a value calculated from the following equation on the assumption that a particle is a rectangular parallelepiped having the average major axial diameter 1 cm and the average minor axial diameter w cm which were measured from the particles in an electron microscopic photograph:

$$S_{TEM}(m^2/g)=[(4 1 w+2 w^2)/1 w^2 \rho_p] \times 10^{-4}$$

where $\rho_p$ is the density of the hematite particle and 5.2 g/cm$^2$ was used.

The contents of Al, $SiO_2$ and P were measured by the use of the fluorescent X-ray analysis apparatus 3063 M-type manufactured by Rigaku Denki Kogyo Co., Ltd., according to the rules of fluorescent X-ray analysis of JIS K 0119.

The resin desorption ratio shows a desorbable degree of a resin absorbed onto the acicular hematite particles. As the resin desorption ratio (%) measured by the following method becomes close the zero, the resin becomes difficult to be desorbed from the surfaces of the acicular hematite particles:

First, 10 g of the acicular hematite particles, 20.5 g of a resin solution obtained by dissolving 0.5 g of the resin in 20 g of a mixed solvent (methyl ethyl ketone/toluene/cyclohexanone=5/3/2), and 100 g of 1 mm$\phi$ glass beads were charged into a 140 ml glass bottle and the contents were mixed and dispersed for 2 hours by the use of a paint shaker.

Next, the paint composition obtained was taken and introduced into a settling tube and centrifuged at 10000 rpm for 15 minutes to separate a supernatant liquid from a solid. The amount of the resin contained in the supernatant liquid is weighed and the amount of the resin adsorbed onto the particles Wa (mg/g) is calculated by deducting the measured amount from the amount of the resin charged.

Next, the solid obtained by the centrifugation is evaporated to dryness and the dried solid containing 5 g of the particles is charged into a 140 ml glass bottle. 10 g of the avove-mentioned mixed solvent and 50 g mm$\phi$ glass beads are added, mixed and dispersed for 2 hours by the used of the paint shaker.

The obtained contents are introduced into the settling tube and centrifuged at 10000 rpm for 15 minutes to separate a supernatant liquid from a solid. The amount of the resin desorbed in the supernatant liquid We (mg/g) is weighed and the resin dersorption ratio is calculated from the following equation:

Resin desorption ratio (%)=(We/Wa)×100

The viscosity of the coating composition was measured at 25° C. by the use of an E type Viscometer EMD-R manufactured by Tokyo Keiki Co., Ltd., at a shear rate of D=1.92 sec$^{-1}$.

The gloss was measured at an angle of incidence of 45° by the use of "Glossmeter UGV-5D manufactured by Suga Shikenki, Co., Ltd.

The dispersion stability of the non-magnetic coating composition is represented by a change in gloss (%) of the coated film measured by the following method. The smaller the change in gloss, the more excellent the dispersion stability.

First, the coated film was formed using a non-magnetic coating composition immediately after being dispesed and the angle of incidence of 45° gloss (Go) is measured. After the non-magnetic coating composition is then left to stand for 60 minutes, the coated film is formed in the samd manner, the angle of incidence of 45° gloss (G) is measured, and the change in gloss is measured by the following equation:

Change in gloss $(\%) = [(G_0 - G)/G_0] \times 100$

The surface roughness Ra is represented by an average value of the center-line average roughness of the coated film measured by the use of "Surfcom-575A" manufactured by Tokyo Seimitsu Co., Ltd.

The stiffness of the coated film is obtained by measuring the Young's modulus of the coated film by the use of "Autograph" manufactured by Shimadzu Corp. The Young's modulus is represented by a relative value with that of a commercially available video tape "AV T-120" manufactured by Victor Company of Japan, Limited. The higher the relative value, more favorable.

The magnetic properties were measured under an external magnetic field of 10 KOe by the use of "Vibration Sample Magnetometer VSM-15" manufactured by Toei Kogyo Co., Ltd.

The electromagnetic performance of the magnetic tape was obtained by the magnetic tape using the coating composition prepared by the prescription as will be described later, which was cut to a ½ inch width, by the use of "Drumtester-BX-3168" manufactured by BELDEX Co., Ltd.

In the case of the magnetic tape using the acicular magnetic iron oxide particles as the magnetic particles, the electromagnetic performance was represented by a relative value of the output performance at a relative speed at 5.8 m/s between the magnetic tape and a head and the recording frequency of 4 MHz with that of each of the reference tape of comparative examples as will be described later.

In the case of the magnetic tape using the acicular magnetic particles mainly containing iron or the plate-like magnetoplumbite ferrite particles as the magnetic particles, the electromagnetic performance was represented by a relative value of the output performance at a relative speed of 3.8 m/s between the magnetic tape and a head and the recording frequency of 7 MHz with that of each of the reference tapes of comparative examples as will be described later.

The storage stability of the magnetic tape was represented by a change width (drop width) in electromagnetic performance measured before and after the storage in the same manner, in which the electromagnetic performance after the storage was measured after stored at a temperature of 60° C. and a relative humidity of 90% for 14 days.

The stain on a head after running of the magnetic tape was made by four-rank evaluation according to the following criteria of the visual observation of a stain on the head after the magnetic tape was caused to run at a relative speed of 16 m/sec with a load of 200 g for 30 minutes by the use of "Mediadurabilitytester MDT-3000" manufactured by Steinberg Associates Co., Ltd:

1: No stain is observed.
2: Stain is slightly observed.
3: Stain is observed.
4: Stain is noticeably observed.

The thickness of the non-magnetic base film, the non-magnetic undercoat layer and the magnetic recording layer forming the magnetic recording medium were measured in the following method:

That is, the film thickness (A) of a non-magnetic base film is first measured by the use of a digital electromicrometer "K 351 C" manufactured by Anritsu Electric Co., Ltd. Next, film thickness (B) of a non-magnetic substrate obtained by forming a non-magnetic undercoat layer on the non-magnetic base film (total of the thickness of the non-magnetic base film and the thickness of the non-magnetic undercoat layer) is measured in the same manner. Moreover, the film thickness (C) of the magnetic recording medium obtained by forming a magnetic recording layer on the non-magnetic undercoat layer (total of the thickness of the non-magnetic base film, the thickness of the non-magnetic undercoat layer and the thickness of the magnetic recording layer) is measured in the same manner.

Accordingly, the film thickness of the non-magnetic undercoat layer is calculated from B minus A and the film thickness of the magnetic recording layer is calculated from C minus B.

<Production of acicular goethite particles and low-density acicular hematite particles>

1500 g of acicular goethite particles obtained by using an aqueous ferrous sulfate solution and an aqueous sodium carbonate solution (average major axial diameter: 0.213 $\mu$m, average minor axial diameter: 0.0246 $\mu$m, aspect ratio: 8.7, BET specific surface area($S_{BET}$): 113.6 m$^2$/g, degree of densification $S_{BET}/S_{TEM}$: 3.43, geometrical standard deviation in the major axial diameter: 1.36, total content of sodium calculated as Na: 1864 ppm, soluble sodium salt calculated as Na: 301 ppm) were suspended in water to form a slurry, and the solid concentration was adjusted to 10 g/liter. 150 liters of the obtained slurry was heated to 60° C. and the pH value was adjusted to 10.0 by addition of a 0.1 mol/liter aqueous KOH solution.

To the alkali slurry, 30 g of phosphoric acid as a sintering-preventing agent was gradually added and aged for 30 minutes after the termination of addition. Then, a 0.5 mol/liter aqueous acetic acid solution was added to thus adjust the pH value to 6.0. Thereafter, the slurry was filtered, washed with water, dried and pulverized by an ordinary method to thereby obtain acicular goethite particles coated with the phosphorus compound. The content of the phosphorus compound calculated as P in the acicular goethite particles was 0.63% by weight based on the weight of the acicular goethite particles.

1300 g of the acicular goethite particles obtained were charged into a stainless steel rotary furnace and dehydrated by heating in air at 320° C. for 30 minutes while rotating the furnace to thereby obtain low-density acicular hematite particles.

The low-density acicular hematite particles obtained had an average major axial diameter of 0.171 $\mu$m, an average minor axial diameter of 0.0221 $\mu$m, an aspect ratio of 7.7, a BET specific surface area ($S_{BET}$) of 141.6 m$^2$/g, at $S_{BET}/S_{TEM}$ of 3.82, and a geometrical standard deviation in the major axial diameter of 1.36. The total content of sodium (calculated as Na) was 1871 ppm, the content of the soluble sodium salts (calculated as Na) was 568 ppm and the content of the phosphorus compound (calculated as P) was 0.69% by weight.

<Production of Low-density Acicular Magnetite Particles>

1100 g of the obtained low-density acicular hematite particles were charged into the stainless steel rotary furnace and reduced by heating in a hydrogen gas atmosphere at 450° C. for 120 minutes while rotating the furnace to thereby obtain low-density acicular magnetite particles.

The low-density acicular magnetite particles obtained had an average major axial diameter of 0.166 μm, an average minor axial diameter of 0.0232 μm, an aspect ratio of 7.2, a BET specific surface area ($S_{BET}$) of 54.6 m$^2$/g, an $S_{BET}/S_{TEM}$ of 1.53, and a geometrical standard deviation in the major axial diameter of 1.37. The total content of sodium (calculated as Na) was 1896 ppm, the content of the soluble sodium salts (calculated as Na) was 1810 ppm and the content of the phosphorus compound (calculated as P) was 0.70% by weight.

<Washing of Low-density Acicular Magnetite Particles With Water>

After 1000 g of the low-density acicular magnetite particles obtained were roughly pulverized by the use of a Nara pulverizer, they were added into 10 liters of pure water and were encountered for 60 minutes by a homomixer manufactured by Tokushu Kika Kogyo Co., Ltd.

The obtained slurry of the low-density acicular magnetite particles was then mixed and dispersed for one hour at an axial rotation of 2000 rpm while being circulated by a horizontal SGM (Dispamat SL manufactured by S.C. Adichem, Co., Ltd. The low-density acicular magnetite particles in the slurry remaining a 325 mesh (sieve opening:44 μm) was zero %. The slurry was washed with water by a decantation method.

The washed slurry containing the low-density acicular magnetite particles was filtered by the use of a filter press and washed by passing pure water till the electric conductivity of a filtrate being not more than 5 μS, then dried by an ordinary method, and pulverized to thereby obtain low-density acicular magnetite particles.

The low-density acicular magnetite particles obtained had an average major axial diameter of 0.163 μm, an average minor axial diameter of 0.0233 μm, an aspect ratio of 7.0, a BET specific surface area ($S_{BET}$) of 53.2 m$^2$/g, an $S_{BET}/S_{TEM}$ of 1.50, and a geometrical standard deviation the major axial diameter of 1.36. The total content of sodium (calculated as Na) was 140 ppm, the content of the soluble sodium salt (calculated as Na) was 52 ppm and the content of the phosphorus compound (calculated as P) was 0.70% by weight.

<Production of High-density Acicular Hematite Particles>

Next, 800 g of the washed low-density acicular magnetite particles were charged into a ceramic rotary furnace and oxidized by heating in the air at 73° C. for 30 minutes while rotating the furnace to thereby obtain high-density acicular hematite particles.

The high-density acicular hematite particles obtained had an average major axial diameter of 0.159 μm, an average minor axial diameter of 0.0235 μm, an aspect ratio of 6.8, a BET specific surface area ($S_{BET}$) of 50.0 m$^2$/g, an $S_{BET}/S_{TEM}$ of 1.42, and a geometrical standard deviation in the major axial diameter of 1.37. The total content of sodium (calculated as Na) was 138 ppm, the content of the soluble sodium salts (calculated as Na) was 126 ppm and the content of the phosphorus compound (calculated as P) was 0.70% by weight.

<Washing of High-density Acicular Hematite Particles With Water>

After 800 g of the high-density acicular hematite particles obtained were roughly pulverized by the use of a Nara pulverizer, they were added into 8 liters of pure water and were encountered for 60 minutes by a homomixer manufactured by Tokushu Kika Kogyo Co., Ltd.

The obtained slurry of the high-density acicular hematite particles was then mixed and dispersed for one hour at an axial rotation of 2000 rpm while being circulated by a horizontal SGM (Dispamat SL manufactured by S. C. Adichem, Co., Ltd. The high-density acicular hematite particles in the slurry remaining a 325 mesh (sieve opening:44 μm) was zero %. The slurry was washed with water by a decantation method. To be accurate, the slurry concentration at this point was measured and confirmed to be 96 g/liter.

The washed slurry containing the high-density acicular hematite particles was filtered by the use of a filter press and washed by passing pure water till the electric conductivity of a filtrate being not more than 5 μS, then dried by an ordinary method, and pulverized to thereby obtain high-density acicular hematite particles.

The high-density acicular hematite particles obtained had an average major axial diameter of 0.158 μm, an average minor axial diameter of 0.0228 μm, an aspect ratio of 6.9, a BET specific surface area ($S_{BET}$) of 50.2 m$^2$/g, an $S_{BET}/S_{TEM}$ of the 1.39, a geometrical standard deviation in the major axial diameter of 1.37, and a resin desorption ratio of 8.6%. The total content of sodium (calculated as Na) was 19 ppm, the content of the soluble sodium salts (calculated as Na) was 8 ppm, the storage stability under a high temperature and a high relative humidity (soluble sodium salts calculated as Na) was 9 ppm, and the content of the phosphorus compound (calculated as P) was 0.69% by weight.

<Production of a Non-magnetic Undercoat Layer>

The obtained high-density acicular hematite particles, a binder resin and a solvent were mixed and kneaded at a solid concentration of 75% by weight by the use of a plast mill for 30 minutes. Thereafter, a given amount of the kneaded mixture was taken out and charged into a glass bottle together with glass beads and solvents, then mixed and despersed for 6 hours by a paint conditioner.

The non-magnetic coating composition obtained was given below:

| | |
|---|---|
| Acicular hematite particles | 100 parts by weight |
| Vinyl chloride-vinyl acetate copolymer resin containing sodium sulfonate groups | 10 parts by weight |
| Polyurethane resin containing sodium sulfonate groups | 10 parts by weight |
| Cyclohexanone | 44.6 parts by weight |
| Methy ethyl ketone | 111.4 parts by weight |
| Toluene | 66.9 parts by weight |

The obtained non-magnetic coating composition was applied by an applicator to a 14 μm-thick polyethylene terephthalate film to a thickness of 55 μm and dried to thus form a non-mognetic undercoat layer.

The thickness of the non-magnetic undercoat layer was 3.5 μm.

The gloss of the non-magnetic undercoat layer was 216%, the surface roughness Ra was 5.6 nm and the Yung's modulus was 135.

Moreover, after the non-magnet coating composition was left to stand for 60 minutes, the undercoat layer was formed on a 14 μm-thick polyethylen terephthalate film in the same manner as above. The gloss of the non-magnet undercoat layer was 213% and the change in gloss showing the dispersibility of the non-magnetic coating composition was 1.4%.

<Production of Magnetic Recording Medium>

Acicular metal magnetic particles mainly containing iron (average major axial diameter:0.103 µm, average minor axial diameter:0.0152 µm, aspect ratio:6.8, coercive force:1910 Oe, saturation magnetization:136 emu/g), a binder resin and a solvent were mixed and kneaded at a solid concentration of 78% by weight by the use of a plast mill for 30 minutes. The kneaded mixture was charged into a glass bottle together with glass beads and solvents, then mixed and dispersed for 6 hours by a paint conditioner.

TABLE 1

| | Characteristics of acicular geothite particles | | | | | | | | |
|---|---|---|---|---|---|---|---|---|---|
| Kind of acicular geothite particles | Average major axial diameter (µm) | Average minor axial diameter (µm) | Aspect ratio (—) | Geometrical standard deviation (—) | $S_{BET}$ ($m^2/g$) | $S_{TEM}$ ($m^2/g$) | $S_{BET}/S_{TEM}$ (—) | Total content of sodium (calculated as Na) (ppm) | Content of soluble sodium salts (calculated as Na) (ppm) |
| Particles described in the embodiment | 0.213 | 0.0246 | 8.7 | 1.36 | 113.6 | 33.1 | 3.43 | 1,864 | 301 |
| Geothite particles 1 | 0.153 | 0.0188 | 8.1 | 1.33 | 171.1 | 43.4 | 3.94 | 1,538 | 416 |
| #2 | 0.186 | 0.0201 | 9.3 | 1.35 | 152.6 | 40.3 | 3.78 | 1,965 | 513 |
| #3 | 0.265 | 0.0278 | 9.5 | 1.32 | 83.2 | 29.1 | 2.86 | 2,562 | 458 |

Thereafter, a polishing agent, a lubricant and a hardener were further added and the mixture was further mixed and dispersed for 15 minutes. The composition of the magnetic coating composition obtained was given below:

| | |
|---|---|
| Acicular metal magnetic particles mainly containing iron | 100 parts by weight |
| Vinyl chloride-vinyl acetate copolymer resin containing sodium sulfate groups | 10 parts by weight |
| Polyurethane resin containing sodium sulfate groups | 10 parts by weight |
| Polishing agent (AKP-30 manufactured by Sumitomo Chemical Corp) | 10 parts by weight |
| Carbonblack (#3250 B manufactured by Mitsubishi Chemical Corp.) | 1 part by weight |
| Lubricant (myristic acid:butyl stearate = 1:2) | 3 parts by weight |
| Hardener (polyisocyanate) | 5 parts by weight |
| Cyclohexanone | 64.9 parts by weight |
| Methyl ethyl ketone | 162.2 parts by weight |
| Toluene | 97.3 parts by weight |

The magnetic coating composition obtained was applied by an applicator to the non-magnetic undercoat layer to a thickness of 15 µm and oriented and dried in a magnetic field, then calendered. The magnetic recording medium was subjected to a curing reaction at 60° C. for 24 hours and the multilayered film was slit into a width of 0.5 inch to thereby obtain a magnetic tape.

The thickness of the magnetic recording layer was 1.0 µm.

The coercive force Hc of the obtained magnetic tape was 1980 Oe, the squareness (Br/Bm) was 0.87, the gloss was 236%, the surface roughness Ra was 5.7 nm and the Young's modulus was 137. The electromagnetic performance at a relative speed between the magnetic tape and a head of 3.8 m/s and a recording frequency of 7 MHz was +1.1 dB when the magnetic tape obtained by Comparative Example 34 as will be described later was used as the reference tape. The drop width of the electromagnetic performance at a recording frequency of 7 MHz after stored at a temperature of 60° C. and a relative humidity of 70% for 14 days was 0.1 dB.

The stain on the head after running of the magnetic tape for 30 minutes was 1.

Hereinafter, the present invention will be explained in more detail by way of examples and comparative examples, which in no way limit the scope of the present invention.

<Kind of Acicular Goethite Particles>

As the starting material for the production of acicular hematite particles, the goethite particles described in the above-mentioned embodiment and acicular goethite particles 1 to 3 set forth in Table 1 were prepared.

<Production of Low-density Acicular Hematite Particles>

Particles to be treated (Precursors) 1 to 4,

COMPARATIVE EXAMPLE 1

Acicular low-density hematite particles to be treated were obtained in the same manner as in the above-mentioned embodiment except that the kind of acicular goethite particles, the kind of sintering-preventing agents and amounts thereof added, heating and dehydration temperatures and times were veried.

The main production conditions and the characteristics are shown in Table 2 and Table 3.

TABLE 2

| | | Sintering-preventing treatment | | | Heating and dehydration treatment | |
|---|---|---|---|---|---|---|
| Precursor and Comp. Ex. | Kind of acicular goethite particles | Kind | Cal-cu-lated | A-mount added (wt. %) | Temp. (° C.) | Time (min) |
| Precursor 1 | Particles described in the embodiment | Phosphoric acid | P | 1.51 | 320 | 30 |
| Precursor 2 | Goethite particles 1 | Colloidal silica | $SiO_2$ | 2.03 | 340 | 30 |
| Precursor 3 | Goethite particles 2 | Phosphoric acid | P | 1.01 | 310 | 30 |
| Precursor 4 | Goethite particles 3 | Colloidal silica | $SiO_2$ | 3.06 | 370 | 30 |
| Comp. Ex. 1 | Particles described in the embodiment | Colloidal silica | $SiO_2$ | 1.03 | 340 | 30 |

TABLE 3

Characteristics of low-density acicular hematite particles

| Precursor and Comp. Ex. | Average major axial diameter (μm) | Average minor axial diameter (μm) | Geometrical standard deviation (—) | Aspect ratio (—) | $S_{BET}$ (m²/g) | $S_{TEM}$ (m²/g) | $S_{BET}/S_{TEM}$ (—) | Amount of sintering-preventing agent Calculated | Content (wt. %) | Total content of sodium (ppm) | Content of soluble sodium salts (ppm) | Desorption ratio of resin (%) |
|---|---|---|---|---|---|---|---|---|---|---|---|---|
| Precursor 1 | 0.173 | 0.0229 | 1.36 | 7.6 | 146.8 | 35.8 | 4.10 | P | 1.64 | 1,888 | 613 | 68.3 |
| #2 | 0.148 | 0.0185 | 1.33 | 8.0 | 192.1 | 44.2 | 4.35 | $SiO_2$ | 2.24 | 1,546 | 712 | 71.2 |
| #3 | 0.175 | 0.0196 | 1.35 | 8.9 | 168.3 | 41.4 | 4.06 | P | 1.11 | 1,983 | 583 | 68.6 |
| #4 | 0.246 | 0.0268 | 1.33 | 9.2 | 110.0 | 30.3 | 3.63 | $SiO_2$ | 3.34 | 2,580 | 512 | 69.2 |
| Comp. Ex. 1 | 0.173 | 0.0230 | 1.36 | 7.5 | 132.5 | 35.7 | 3.71 | $SiO_2$ | 1.13 | 1,872 | 588 | 69.3 |

<Production of Low-density Acicular Magnetite Particles>

Particles to be treated (Precursors) 5 to 8,

COMPARATIVE EXAMPLES 2 TO 4

Acicular low-density magnetite particles were obtained in the same manner as in the above-mentioned embodiment except that the kind of particles to be treated, heating and reduction temperatures and times were varied.

The main production conditions and the characteristics are shown in Table 4 and Table 5.

TABLE 4

| Precursor and Comp. Ex. | Kind of particles to be treated | Heating and reduction Atmosphere | Temp. (° C.) | Time (min) |
|---|---|---|---|---|
| Precursor 5 | Precursor 1 | Hydrogen gas | 480 | 120 |
| Precursor 6 | Precursor 2 | " | 400 | 180 |
| Precursor 7 | Precursor 3 | " | 410 | 160 |
| Precursor 8 | Precursor 4 | " | 500 | 100 |
| Comp. Ex. 2 | Comp. Ex. 1 | " | 450 | 120 |
| Comp. Ex. 3 | Comp. Ex. 1 | " | 650 | 120 |
| Comp. Ex. 4 | Comp. Ex. 1 | " | 200 | 120 |

TABLE 5

Characteristics of low-density acicular hematite particles

| Precursor and Comp. Ex. | Average major axial diameter (μm) | Average minor axial diameter (μm) | Geometrical standard deviation (—) | Aspect ratio (—) | $S_{BET}$ (m²/g) | $S_{TEM}$ (m²/g) | $S_{BET}/S_{TEM}$ (—) | Amount of sintering-preventing agent Calculated | Content (wt. %) | Total content of sodium (ppm) | Content of soluble sodium salts (ppm) | Desorption ratio of resin (%) |
|---|---|---|---|---|---|---|---|---|---|---|---|---|
| Precursor 5 | 0.168 | 0.0230 | 1.36 | 7.3 | 53.8 | 35.7 | 1.51 | P | 1.67 | 1,879 | 1,792 | 78.8 |
| #6 | 0.142 | 0.0187 | 1.34 | 7.6 | 63.6 | 43.8 | 1.45 | $SiO_2$ | 2.28 | 1,551 | 1,474 | 75.6 |
| #7 | 0.170 | 0.0195 | 1.35 | 8.7 | 52.6 | 41.7 | 1.26 | P | 1.15 | 1,988 | 1,927 | 72.1 |
| #8 | 0.241 | 0.0266 | 1.33 | 9.1 | 43.8 | 30.5 | 1.44 | $SiO_2$ | 3.37 | 2,590 | 2,492 | 76.1 |
| Comp. Ex. 2 | 0.170 | 0.0228 | 1.37 | 7.5 | 51.6 | 36.0 | 1.43 | $SiO_2$ | 1.15 | 1,880 | 1,821 | 73.2 |
| #3 | 0.140 | 0.0503 | 1.83 | 2.8 | 27.6 | 18.0 | 1.53 | $SiO_2$ | 1.15 | 1,893 | 1,850 | 78.6 |
| #4 | 0.170 | 0.0230 | 1.36 | 7.4 | 116.5 | 35.7 | 3.26 | $SiO_2$ | 1.14 | 1,886 | 712 | 88.9 |

<Washing of Low-density Acicular Magnetite Particles With Water>

Particles to be treated (Precursors) 9 to 12

COMPARATIVE EXAMPLES 5 TO 7

Acicular low-density magnetite particles were obtained in the same manner as in the above-mentioned embodiment except that the kind of particles to be treated and presence or absence of a wet-pulverization were veried.

The main production conditions and the characteristics are shown in Table 6 and Table 7.

TABLE 6

| Precursor and Comp. Ex. | Kind of particles to be treated | Wet-pulverization Presence or absence | Remaining amount on sieve (wt. %) |
|---|---|---|---|
| Precursor 9 | Precursor 5 | Presence | 0 |
| Precursor 10 | Precursor 6 | Presence | 0 |
| Precursor 11 | Precursor 7 | Presence | 0 |
| Precursor 12 | Precursor 8 | Presence | 0 |
| Comp. Ex. 5 | Comp. Ex. 2 | Presence | 0 |
| Comp. Ex. 6 | Comp. Ex. 3 | Presence | 0 |
| Comp. Ex. 7 | Comp. Ex. 4 | Presence | 0 | except that the kind of particles to be treated and heating and oxidation temperatures and times were veried.

The main production conditions and the characteristics are shown in Table 8 and Table 9.

TABLE 8

| Precursor and Comp. Ex. | Kind of particles to be treated | Heating and oxidation Atmosphere | Temp. (° C.) | Time (min) |
|---|---|---|---|---|
| Precursor 13 | Precursor 9 | Air | 750 | 30 |
| Precursor 14 | Precursor 10 | " | 700 | 60 |
| Precursor 15 | Precursor 11 | " | 730 | 60 |
| Precursor 16 | Precursor 12 | " | 780 | 30 |
| Comp. Ex. 8 | Comp. Ex. 5 | " | 750 | 30 |
| Comp. Ex. 9 | Comp. Ex. 5 | " | 880 | 30 |
| Comp. Ex. 10 | Comp. Ex. 5 | " | 500 | 30 |
| Comp. Ex. 11 | Comp. Ex. 4 | " | 700 | 30 |

TABLE 7

Characteristics of low-density acicular magnetite particles after washing with water

| Precursor and Comp. Ex. | Average major axial diameter ($\mu$m) | Average minor axial diameter ($\mu$m) | Geometrical standard deviation (—) | Aspect ratio (—) | $S_{BET}$ (m²/g) | $S_{TEM}$ (m²/g) | $S_{BET}/S_{TEM}$ (—) | Amount of sintering-preventing agent Calculated | Content (wt. %) | Total content of sodium (ppm) | Content of soluble sodium salts (ppm) | Desorption ratio of resin (%) |
|---|---|---|---|---|---|---|---|---|---|---|---|---|
| Precursor 9 | 0.168 | 0.0230 | 1.36 | 7.3 | 52.9 | 35.7 | 1.48 | P | 1.67 | 128 | 43 | 38.6 |
| #10 | 0.143 | 0.0186 | 1.34 | 7.7 | 63.9 | 44.0 | 1.45 | SiO$_2$ | 2.27 | 139 | 65 | 41.2 |
| #11 | 0.170 | 0.0194 | 1.35 | 8.8 | 53.1 | 41.9 | 1.27 | P | 1.16 | 99 | 40 | 32.6 |
| #12 | 0.241 | 0.0265 | 1.33 | 9.1 | 43.2 | 30.6 | 1.41 | SiO$_2$ | 3.38 | 180 | 63 | 36.8 |
| Comp. Ex. 5 | 0.170 | 0.0228 | 1.36 | 7.5 | 51.6 | 36.0 | 1.43 | SiO$_2$ | 1.16 | 120 | 63 | 40.3 |
| #6 | 0.139 | 0.0504 | 1.85 | 2.8 | 27.3 | 18.0 | 1.51 | SiO$_2$ | 1.15 | 98 | 55 | 45.6 |
| #7 | 0.169 | 0.0229 | 1.36 | 7.4 | 117.1 | 35.9 | 3.26 | SiO$_2$ | 1.15 | 1,287 | 113 | 76.9 |

<Production of High-density Acicular Hematite Particles>

Particles to be treated (Precursors) 13 to 16,

COMPARATIVE EXAMPLES 8 TO 11

Acicular high-density hematite particles were obtained in the same manner as in the above-mentioned embodiment

TABLE 9

Characteristics of high density acicular hematite particles

| Precursor and Comp. Ex. | Average major axial diameter ($\mu$m) | Average minor axial diameter ($\mu$m) | Geometrical standard deviation (—) | Aspect ratio (—) | $S_{BET}$ (m²/g) | $S_{TEM}$ (m²/g) | $S_{BET}/S_{TEM}$ (—) | Amount of sintering-preventing agent Calculated | Content (wt. %) | Total content of sodium (ppm) | Content of soluble sodium salts (ppm) | Desorption ratio of resin (%) |
|---|---|---|---|---|---|---|---|---|---|---|---|---|
| Precursor 13 | 0.163 | 0.0231 | 1.37 | 7.1 | 50.8 | 35.7 | 1.42 | P | 1.67 | 128 | 100 | 51.6 |
| #14 | 0.139 | 0.0187 | 1.35 | 7.4 | 60.6 | 43.9 | 1.38 | SiO$_2$ | 2.28 | 136 | 112 | 48.2 |
| #15 | 0.164 | 0.0196 | 1.35 | 8.4 | 49.8 | 41.6 | 1.20 | P | 1.16 | 96 | 93 | 41.6 |
| #16 | 0.234 | 0.0268 | 1.34 | 8.7 | 42.6 | 30.3 | 1.40 | SiO$_2$ | 3.39 | 182 | 139 | 56.8 |

TABLE 9-continued

Characteristics of high density acicular hematite particles

| Precursor and Comp. Ex. | Average major axial diameter (μm) | Average minor axial diameter (μm) | Geometrical standard deviation (—) | Aspect ratio (—) | $S_{BET}$ (m²/g) | $S_{TEM}$ (m²/g) | $S_{BET}/S_{TEM}$ (—) | Amount of sintering-preventing agent Calculated | Content (wt. %) | Total content of sodium (ppm) | Content of soluble sodium salts (ppm) | Desorption ratio of resin (%) |
|---|---|---|---|---|---|---|---|---|---|---|---|---|
| Comp. Ex. 8 | 0.170 | 0.0229 | 1.37 | 7.4 | 51.8 | 35.9 | 1.44 | $SiO_2$ | 1.16 | 122 | 100 | 48.9 |
| #9 | 0.121 | 0.0401 | 1.86 | 3.0 | 31.6 | 22.4 | 1.41 | $SiO_2$ | 1.15 | 101 | 89 | 39.6 |
| #10 | 0.169 | 0.0230 | 1.36 | 7.3 | 118.0 | 35.7 | 3.30 | $SiO_2$ | 1.15 | 121 | 412 | 71.6 |
| #11 | 0.242 | 0.0269 | 1.34 | 9.0 | 44.4 | 30.2 | 1.47 | $SiO_2$ | 3.39 | 1,883 | 1,471 | 82.6 |

<Washing of High-density Acicular Hematite Particles With Water>

EXAMPLES 1 TO 4

COMPARATIVE EXAMPLE 12

Acicular high-density hematite particles after washing with water were obtained in the same manner as in the above-mentioned embodiment except that the kind of particles to be treated and presence or absence of a wet-pulverization were veried.

The main production conditions and the characteristics are shown in Table 10 and Table 11.

TABLE 10

| | | Wet-pulverization | |
|---|---|---|---|
| Example and Comp. Ex. | Kind of particles to be treated | Presence or absence | Remaining amount on sieve (wt. %) |
| Example 1 | Precursor 13 | Presence | 0 |
| Example 2 | Precursor 14 | Presence | 0 |
| Example 3 | Precursor 15 | Presence | 0 |
| Example 4 | Precursor 16 | Presence | 0 |
| Comp. Ex. 12 | Comp. Ex. 11 | Presence | 0 |

<Coating Treatment of High-density Acicular Hematite Particles>

EXAMPLE 5

After 700 g of the high-density acicular hematite particles obtained in Example 1 were roughly pulverized by the use of a Nara pulverizer, they were added into 7 liters of pure water and were encountered for 60 minutes by a homomixer manufactured by Tokushu Kika Kogyo Co., Ltd.

The obtained slurry of the high-density acicular hematite particles was then mixed and dispersed for 6 hours at an axial rotation of 2000 rpm while being circulated by a horizontal SGM (Dispamat SL manufactured by S.C. Adichem, Co., Ltd. The pH value of the slurry obtained was adjusted to 4.0 by the use of an aqueous 0.1 mol/liter acetic acid solution and pure water was added into this slurry to adjust the slurry concentration to 96 g/liter. 5 liters of this slurry were heated to 60° C. and 266 ml of an aqueous 1.0 mol/liter aluminum acetate solution (corresponding to 1.5% by weight calculated as Al to the high-density acicular hematite particles) were added into this slurry and maintained for 30 minutes, then the pH value of the slurry was adjusted to 7.0 by the use of an aqueous 0.1 mol/liter sodium hydroxide solution. The slurry was maintained for 30 minutes, then filtered by the use of a filter press and washed by passing pure water till the electric conductivity of a filtrate being not more than 5 μS in the same manner as in the above embodiment, then dried and pulverized to thereby

TABLE 11

Characteristics of high-density acicular hematite particles after washing with water

| Example and Comp. Ex. | Average major axial diameter (μm) | Average minor axial diameter (μm) | Geo-metrical standard deviation (—) | Aspect ratio (—) | $S_{BET}$ (m²/g) | $S_{TEM}$ (m²/g) | $S_{BET}/S_{TEM}$ (—) | Amount of sinterin-preventing agent Calculated | Content (wt. %) | Total content of soluble sodium (ppm) | Content of soluble sodium salts (ppm) | Content of soluble sodium salts after passage of time *1) (ppm) | Desorption ratio of resin (%) |
|---|---|---|---|---|---|---|---|---|---|---|---|---|---|
| Example 1 | 0.163 | 0.0230 | 1.37 | 7.1 | 50.3 | 35.8 | 1.40 | P | 1.67 | 21 | 6 | 7 | 8.2 |
| #2 | 0.139 | 0.0187 | 1.34 | 7.4 | 61.1 | 43.9 | 1.39 | $SiO_2$ | 2.28 | 32 | 13 | 15 | 7.6 |
| #3 | 0.163 | 0.0195 | 1.35 | 8.4 | 48.9 | 41.8 | 1.17 | P | 1.16 | 8 | 6 | 6 | 6.8 |
| #4 | 0.234 | 0.0268 | 1.34 | 8.7 | 42.1 | 30.3 | 1.39 | $SiO_2$ | 3.39 | 44 | 26 | 28 | 12.3 |
| Comp. Ex. 12 | 0.242 | 0.0270 | 1.35 | 9.0 | 43.6 | 30.1 | 1.45 | $SiO_2$ | 3.35 | 365 | 43 | 165 | 36.8 |

*1) Soluble sodium salts (calculated as Na) contained in particles after left to stand at a temperature of 60° C. and a relative humidity of 90% for 14 days.

obtain high-density acicular hematite particles, the surfaces of which were coated with aluminium hydroxide.

The main production conditions and the characteristics are shown in Table 12 and Table 13.

EXAMPLE 6 TO 8

Acicular hematite particles were obtained in the same manner as in Example 5, except that the kind of acicular hematite particles, the kind and the amount of the coating substances were varied.

The main production conditions and the characteristics are shown in Table 12 and Table 13.

TABLE 12

| | | Surface treatment | | | | |
|---|---|---|---|---|---|---|
| Example | Kind of acicular hematite particles | Kind | Amount added (Al or SiO$_2$) (wt. %) | Kind*$^{2)}$ | Substances coated Calculated | Amount coated (wt. %) |
| Example 5 | Example 1 | Aluminium acetate | 1.5 | A | Al | 1.48 |
| Example 6 | Example 2 | Colloidal silica | 1.0 | S | SiO$_2$ | 0.98 |
| Example 7 | Example 3 | Aluminium acetate | 3.0 | A | Al | 2.91 |
| Example 8 | Example 4 | Aluminium acetate | 2.0 | A | Al | 1.94 |
| | | Colloidal silica | 0.5 | S | SiO$_2$ | 0.48 |

*$^{2)}$A: aluminium hydroxide   S: silicon oxide phosphorus compound. The acicular goethite particles contained 0.32% by weight of the phosphorus compound calculated as P.

1300 g of the acicular goethite particles obtained were then charged into a ceramic rotary furnace and oxidized by heating in air at 650° C. for 30 minutes while rotating the furnace.

The acicular hematite particles obtained had an average major axial diameter of 0.236 μm, an average minor axial diameter of 0.0311 μm, an aspect ratio of 7.8, a BET specific surface area ($S_{BET}$) of 40.8 m$^2$/g, an $S_{BET}/S_{TEM}$ of 1.54, a geometrical standard deviation of the major axial diameter of 1.37, a total alkali content (total amount of Na calculated and K calculated) of 102 ppm, a soluble sodium salt content (calculated as Na) of 21 ppm, a storage stability (soluble sodium salt calculated as Na) under a high temperature and a high humidity of 98 ppm and a content of the phosphorus compound calculated as P of 0.35% by weight.

COMPARATIVE EXAMPLE 14

1500 g of acicular goethite particles (average major axial diameter:0.236 μm, average minor axial diameter:0.0300 μm, aspect ratio:7.9, BET specific surface area ($S_{BET}$):93.1 m$^2$/g, degree of densification $S_{BET}/S_{TEM}$:3.41, geometrical standard deviation of the major axial diameter:1.37, total sodium content (calculated as Na):1912 ppm, soluble sodium salt content (calculated as Na):296 ppm) obtained by using an aqueous ferrous sulfate solution and an aqueous sodium carbonate solution were suspended in water to form a slurry. To the slurry, 20 g of phosphoric acid were added as a sintering-preventing agent, and the mixture was filtered by an ordinary method and washed with water by passing deionized water till the electric conductivity of a filtrate

TABLE 13

Characteristics of high-density acicular hematite particles washed with water after surface treatment

| Example | Average major axial diameter (μm) | Average minor axial diameter (μm) | Geometrical standard deviation (—) | Aspect ratio (—) | $S_{BET}$ (m$^2$/g) | $S_{TEM}$ (m$^2$/g) | $S_{BET}/S_{TEM}$ (—) | Amount of sintering-preventing agent Calculated | Content (wt. %) | Total content of sodium (ppm) | Content of soluble sodium salts (ppm) | Content of soluble sodium salts after passage of time *1) (ppm) | Desorption ratio of resin (%) |
|---|---|---|---|---|---|---|---|---|---|---|---|---|---|
| Example 5 | 0.163 | 0.0230 | 1.37 | 7.1 | 51.1 | 35.8 | 1.43 | P | 1.65 | 18 | 3 | 3 | 3.4 |
| #6 | 0.139 | 0.0188 | 1.34 | 7.4 | 62.1 | 43.7 | 1.42 | SiO$_2$ | 2.26 | 35 | 6 | 6 | 2.8 |
| #7 | 0.163 | 0.0194 | 1.35 | 8.4 | 48.1 | 42.0 | 1.14 | P | 1.13 | 10 | 8 | 8 | 4.1 |
| #8 | 0.234 | 0.0268 | 1.34 | 8.7 | 41.6 | 30.3 | 1.37 | SiO$_2$ | 3.32 | 42 | 21 | 21 | 3.0 |

*1) Soluble sodium salts (calculated as Na) contained in particles after left to stand at a temperature of 60° C. and a relative humidity of 90% for 14 days.

COMPARATIVE EXAMPLE 13

1500 g of acicular goethite particles (average major axial diameter:0.248 μm, average minor axial diameter:0.0306 μm, aspect ratio:8.1, BET specific surface area ($S_{BET}$):86.5 m$^2$/g, degree of densification $S_{BET}/S_{TEM}$:3.24, geometrical standard deviation of the major axial diameter;1.53, total alkali content (total amount of Na calculated and K calculated):113 ppm, soluble sodium salt content (Na calculated):21 ppm) obtained by using an aqueous ferrous sulfate solution and an aqueous ammonia solution were suspended in water to form a slurry. To the slurry, 15 g of phosphoric acid were added as a sintering-preventing agent, followed by filtration, washing with water, drying and pulverization by an ordinary method to thereby obtain acicular goethite particles with their surfaces coated with the becomes not more than 1 μS, followed by drying and pulverization to thereby obtain acicular goethite particles with their surfaces coated with the phosphorus compound. The acicular goethite particles contained 0.41% by weight of the phosphorus compound calculated as P.

1300 g of the acicular goethite particles obtained were then charged into a ceramic rotary furnace and oxidized by heating in air at 700° C. for 30 minutes while rotating the furnace.

The acicular hematite particles obtained had an average major axial diameter of 0.206 μm, an average minor axial diameter of 0.0309 μm, an aspect ratio of 6.7, a BET specific surface area ($S_{BET}$) of 41.1 m$^2$/g, an $S_{BET}/S_{TEM}$ of 1.54, a geometrical standard deviation of the major axial diameter of the major axial diamer of 1.38, a total sodium content (Na calculated) of 1480 ppm, a soluble sodium salt content (calculated as Na) of 116 ppm, a storage stability (soluble sodium salt calculated as Na) under a high temperature and a high humidity of 388 ppm and a content of the phosphorus compound calculated as P of 0.48% by weight.

<Production of a Non-magnetic Undercoat Layer>

EXAMPLES 9 TO 16

COMPARATIVE EXAMPLES 15 TO 24

Non-magnetic undercoat layers were obtained in the same manner as in the above-mentioned embodiment, except that the kind of the acicular hematite particles was varied.

The main production conditions and the characteristics are shown in Table 14.

<Production of a Magnetic Recording Medium>

EXAMPLES 17 TO 24

COMPARATIVE EXAMPLES 25 TO 37

Magnetic recording media were produced in the same manner as in the above-mentioned embodiment, except that the kind of the non-magnetic undercoat layers and the kind of the magnetic particles were varied.

Meanwhile, the characteristics of the magnetic particles M-1 to M-3 are shown in Table 15.

TABLE 14

| Example and Comp. Ex. | Kind of acicular hematite particles | Production of non-magnetic composition Weight ratio of particles/resin (—) | Characteristics of non-magnetic composition Viscosity (cP) | Characteristics of non-magnetic undercoat layer | | | | |
|---|---|---|---|---|---|---|---|---|
| | | | | Film thickness ($\mu$m) | Gloss (%) | Change In gloss (%) | Ra (nm) | Young's modulus (relative value) |
| Example 9 | Example 1 | 5.0 | 384 | 3.5 | 198 | 1.4 | 6.0 | 135 |
| #10 | #2 | 5.0 | 410 | 3.5 | 208 | 3.2 | 5.8 | 135 |
| #11 | #3 | 5.0 | 384 | 3.4 | 201 | 0.9 | 6.2 | 135 |
| #12 | #4 | 5.0 | 307 | 3.4 | 198 | 1.5 | 6.4 | 138 |
| #13 | #5 | 5.0 | 333 | 3.5 | 204 | 2.1 | 6.0 | 136 |
| #14 | #6 | 5.0 | 410 | 3.5 | 211 | 3.6 | 5.6 | 137 |
| #15 | #7 | 5.0 | 333 | 3.4 | 206 | 1.6 | 5.8 | 138 |
| #16 | #8 | 5.0 | 282 | 3.5 | 208 | 2.0 | 5.8 | 141 |
| Comp. Ex. 15 | Comp. Ex. 1 | 5.0 | 23,040 | 3.8 | 121 | 21.4 | 36.4 | 110 |
| #16 | #5 | 5.0 | 3,072 | 3.6 | 68 | 14.6 | 56.8 | 93 |
| #17 | #6 | 5.0 | 768 | 3.5 | 32 | 11.0 | 71.2 | 70 |
| #18 | #7 | 5.0 | 20,480 | 4.1 | 72 | 23.9 | 46.6 | 81 |
| #19 | #8 | 5.0 | 640 | 3.5 | 173 | 11.2 | 14.8 | 111 |
| #20 | #9 | 5.0 | 410 | 3.5 | 101 | 14.2 | 18.2 | 96 |
| #21 | #10 | 5.0 | 1,024 | 3.7 | 86 | 22.6 | 38.2 | 93 |
| #22 | #12 | 5.0 | 384 | 3.5 | 189 | 10.1 | 8.6 | 125 |
| #23 | #13 | 5.0 | 287 | 3.5 | 168 | 10.6 | 14.6 | 121 |
| #24 | #14 | 5.0 | 205 | 3.5 | 172 | 12.9 | 13.8 | 121 |

TABLE 15

| | | Characteristics of magnetic particles | | | | | | |
|---|---|---|---|---|---|---|---|---|
| Magnetic particles | Kind of magnetic particles | Average major axial diameter ($\mu$m) | Average minor axial diameter ($\mu$m) | Geometrical standard deviation (—) | Aspect ratio (—) | BET specific surface area ($m^2$/g) | Coercive force (Oe) | Saturation magnetization (emu/g) |
| M-1 | Metal magnetic particles | 0.135 | 0.0191 | 1.38 | 7.1 | 53.5 | 2,240 | 138.2 |
| M-2 | Ba ferrite particles[*3] | 0.053 | 0.0160 | 1.21 | 3.3 | 58.2 | 2,510 | 52.6 |
| M-3 | Co-coated magnetite particles | 0.180 | 0.0252 | 1.35 | 7.1 | 41.6 | 968 | 78.6 |

[*3]With respect to Ba ferrite particles, the plate diameter, the thickness and the plate ratio (plate diameter/thickness) were regarded as "average major axial diameter", " average minor axial diameter" and "aspect ratio", respectively.

The main production conditions and the characteristics are shown in Table 16 and Table 17.

The electromagnetic performance in Examples 17, 18 and Comparative Examples 25 to 34 were represented by values obtained by using the magnetic tape of Comparative Example 34 as the reference tape.

The electromagnetic performance in Examples 19 and 20 were represented by values obtained by using the magnetic tape of Comparative Example 35 as the reference tape.

The electromagnetic performance in Examples 21 and 22 were represented by values obtained by using the magnetic tape of Comparative Example 36 as the reference tape.

The electromagnetic performance in Examples 23 and 24 were represented by values obtained by using the magnetic tape of Comparative Example 37 as the reference tape.

TABLE 16

| | Production of magnetic recording medium | | | Characteristics of magnetic recording medium | | | | | | | | | | |
|---|---|---|---|---|---|---|---|---|---|---|---|---|---|---|
| | | | | Film thickness of magnetic recording layer (μm) | | | | | | | Electromagnetic performance | | Drop width in electromagnetic performance*[4] | |
| Example | Kind of non-magnetic undercoat layer | Kind of magnetic particles | Weight ratio of particles/resin (—) | | Coercive force (Oe) | Br/Bm (—) | Gloss (%) | Ra (nm) | Young's modulus (Relative value) | Stain on head (—) | 4 MHz (dB) | 7 MHz (dB) | 4 MHz (dB) | 7 MHz (dB) |
| Example 17 | Example 9 | Particles in the embodiment | 5.0 | 1.1 | 1,990 | 0.87 | 238 | 5.7 | 137 | 1 | — | +1.2 | — | 0.2 |
| #18 | #10 | Particles in the embodiment | 5.0 | 1.0 | 1,996 | 0.87 | 241 | 5.6 | 135 | 2 | — | +1.3 | — | 0.1 |
| #19 | #11 | M-1 | 5.0 | 1.0 | 2,310 | 0.88 | 235 | 5.2 | 138 | 2 | — | +2.8 | — | 0.3 |
| #20 | #12 | M-1 | 5.0 | 1.0 | 2,323 | 0.89 | 239 | 5.3 | 139 | 1 | — | +2.6 | — | 0.4 |
| #21 | #13 | M-2 | 5.0 | 1.1 | 2,566 | 0.86 | 266 | 4.8 | 136 | 1 | — | +2.1 | — | 0.3 |
| #22 | #14 | M-2 | 5.0 | 1.0 | 2,532 | 0.86 | 258 | 5.0 | 136 | 1 | — | +2.8 | — | 0.5 |
| #23 | #15 | M-3 | 5.0 | 1.1 | 1,042 | 0.90 | 183 | 5.2 | 143 | 1 | +2.6 | — | 0.1 | — |
| #24 | #16 | M-3 | 5.0 | 1.0 | 1,052 | 0.91 | 188 | 5.6 | 140 | 1 | +3.1 | — | 0.1 | — |

*[4]Drop width in the electromagnetic performance of the magnetic tape after stored at a temperature of 60° C. and a relative humidity of 90% for 14 days.

TABLE 17

| | Production of magnetic recording medium | | | Characteristics of magnetic recording medium | | | | | | | | | | |
|---|---|---|---|---|---|---|---|---|---|---|---|---|---|---|
| | | | | Film thickness of magnetic recording layer (μm) | | | | | | | Electromagnetic performance | | Drop width in electromagnetic performance*[4] | |
| Comp. Ex. | Kind of non-magnetic undercoat layer | Kind of magnetic particles | Weight ratio of particles/resin (—) | | Coercive force (Oe) | Br/Bm (—) | Gloss (%) | Ra (nm) | Young's modulus (Relative value) | Stain on head (—) | 4 MHz (dB) | 7 MHz (dB) | 4 MHz (dB) | 7 MHz (dB) |
| Comp. Ex. 25 | Comp. Ex. 15 | Particles in the embodiment | 5.0 | 1.3 | 1,921 | 0.78 | 186 | 13.8 | 113 | 3 | — | −1.5 | — | 2.6 |
| #26 | #16 | Particles in the embodiment | 5.0 | 1.4 | 1,930 | 0.77 | 132 | 32.8 | 98 | 4 | — | −3.8 | — | 1.8 |
| #27 | #17 | Particles in the embodiment | 5.0 | 1.1 | 1,968 | 0.82 | 116 | 41.6 | 81 | 4 | — | −4.1 | — | 1.6 |
| #28 | #18 | Particles in the embodiment | 5.0 | 1.3 | 1,932 | 0.80 | 121 | 38.8 | 93 | 4 | — | −3.6 | — | 1.9 |
| #29 | #19 | Particles in the embodiment | 5.0 | 1.0 | 1,978 | 0.84 | 204 | 8.2 | 115 | 3 | — | −0.8 | — | 2.3 |
| #30 | #20 | Particles in the embodiment | 5.0 | 1.1 | 1,966 | 0.81 | 176 | 16.6 | 100 | 4 | — | −1.8 | — | 2.0 |
| #31 | #21 | Particles in the embodiment | 5.0 | 1.3 | 1,960 | 0.79 | 156 | 25.8 | 96 | 4 | — | −2.2 | — | 2.2 |

TABLE 17-continued

| | Production of magnetic recording medium | | | Film thickness | Characteristics of magnetic recording medium | | | | | | | | | |
|---|---|---|---|---|---|---|---|---|---|---|---|---|---|---|
| | Kind of non-magnetic | Kind of | Weight ratio of particles/ | of magnetic recording | Coercive | Br/ | | | Young's modulus | Stain | Electromagnetic performance | | Drop width in electromagnetic performance*[4] | |
| Comp. Ex. | undercoat layer | magnetic particles | resin (—) | layer (μm) | force (Oe) | Bm (—) | Gloss (%) | Ra (nm) | (Relative value) | on head (—) | 4 MHz (dB) | 7 MHz (dB) | 4 MHz (dB) | 7 MHz (dB) |
| #32 | #23 | Particles in the embodiment | 5.0 | 1.1 | 1,967 | 0.84 | 180 | 11.2 | 124 | 3 | — | −1.6 | — | 1.3 |
| #33 | #24 | Particles in the embodiment | 5.0 | 1.0 | 1,970 | 0.84 | 184 | 11.0 | 124 | 3 | — | −2.0 | — | 1.2 |
| #34 | #22 | Particles in the embodiment | 5.0 | 1.1 | 1,976 | 0.84 | 215 | 9.6 | 128 | 3 | — | (0.0) | — | 1.6 |
| #35 | #22 | M-1 | 5.0 | 1.0 | 2,295 | 0.83 | 208 | 11.2 | 127 | 3 | — | (0.0) | — | 1.8 |
| #36 | #22 | M-2 | 5.0 | 1.1 | 2,537 | 0.80 | 199 | 16.8 | 123 | 3 | — | (0.0) | — | 1.6 |
| #37 | #22 | M-3 | 5.0 | 1.0 | 1,021 | 0.85 | 201 | 8.8 | 133 | 3 | (0.0) | — | 1.2 | — |

*[4] Drop width in the electromagnetic performance of the magnetic tape after stored at a temperature of 60° C. and a relative humidity of 90% for 14 days.

The acicular hematite particles for a non-magnetic undercoat layer of a magnetic recording medium according to the present invention have an excellent dispersibility in a vehicle so that it is possible to enhance the surface smoothness and the strength of the non-magnetic undercoat layer. When a magnetic recording layer is formed on the non-magnetic undercoat layer, not only can the magnetic recording layer be formed into a smooth and uniform thin film, but also a magnetic recording medium having an excellent electromagnetic performance and an excellent storage stability can be obtained.

The magnetic recording medium according to the present invention uses as particles for a non-magnetic undercoat layer acicular hematite particles with the total content of sodium of not more than 50 ppm which is excellent in storage stability, so that it is excellent in storage stability as well as electromagnetic performance.

What is claimed is:

1. A method for producing particles for a non-magnetic undercoat layer of a magnetic recording medium, which comprises the steps of:

dehydrating acicular goethite particles with the surfaces coated with a sintering-preventing agent to form acicular hematite particles, reducing the acicular hematite particles at a temperature of 250 to 600° C. under a reducing atmosphere to form acicular magnetite particles, washing with pure water and drying the acicular magnetite particles, oxidizing the acicular magnetite particles at a temperature of 650 to 850° C. under an oxidizing atmosphere, and washing with pure water and drying the resulting high-density acicular hematite particles.

2. A method for producing particles for a non-magnetic undercoat layer of a magnetic recording medium, which comprises the steps of:

dehydrating acicular goethite particles to form acicular hematite particles, coating the surfaces of the acicular hematite particles with a sintering-preventing agent, reducing the acicular hematite particles at a temperature of 250 to 600° C. under a reducing atmosphere to form acicular magnetite particles, washing with pure water and drying the acicular magnetite particles, oxidizing the acicular magnetite particles at a temperature of 650 to 850° C. under an oxidizing atmosphere, and washing with pure water and drying the resulting high-density acicular hematite particles.

3. A method of claim 1 or 2, wherein the particles are wet-pulverized prior to washing with pure water.

4. A method of claim 1 or 2, wherein the high-density acicular hematite particles are coated with at least one selected from the group consisting of an aluminium hydroxide, an aluminium oxide, a silicon hydroxide and a silicon oxide by treating the particles with an aqueous solution containing an aluminium compound, a silicon compound or the both compounds.

* * * * *